US012406292B2

(12) United States Patent
Lenfert

(10) Patent No.: US 12,406,292 B2
(45) Date of Patent: Sep. 2, 2025

(54) APPARATUSES AND METHODS FOR SUNLIGHT ASSESSMENT AT A LOCATION

(71) Applicant: Honda Motor Co., Ltd., Tokyo (JP)

(72) Inventor: Nathaniel Lenfert, Graham, NC (US)

(73) Assignee: HONDA MOTOR CO., LTD., Tokyo (JP)

(*) Notice: Subject to any disclaimer, the term of this patent is extended or adjusted under 35 U.S.C. 154(b) by 527 days.

(21) Appl. No.: 17/974,792

(22) Filed: Oct. 27, 2022

(65) Prior Publication Data
US 2024/0144344 A1 May 2, 2024

(51) Int. Cl.
G06Q 30/06 (2023.01)
A01G 20/30 (2018.01)
G01W 1/12 (2006.01)
G06Q 30/0601 (2023.01)
G06T 7/73 (2017.01)
G06V 10/147 (2022.01)
G06V 10/60 (2022.01)

(52) U.S. Cl.
CPC .......... *G06Q 30/0631* (2013.01); *G01W 1/12* (2013.01); *G06T 7/74* (2017.01); *G06V 10/147* (2022.01); *G06V 10/60* (2022.01); *G06T 2207/30188* (2013.01); *G06T 2207/30192* (2013.01)

(58) Field of Classification Search
CPC ....... G06Q 30/0631; G01W 1/12; G06T 7/74; G06T 2207/30188; G06T 2207/30192; G06V 10/147; G06V 10/60; G06V 20/188; A01G 25/16
See application file for complete search history.

(56) References Cited

U.S. PATENT DOCUMENTS

| | | | | |
|---|---|---|---|---|
| 9,235,214 B2* | 1/2016 | Anderson | ............ | G05D 1/0274 |
| 2012/0042563 A1* | 2/2012 | Anderson | ............... | G06N 5/04 |
| | | | | 43/132.1 |
| 2020/0128721 A1* | 4/2020 | Lewis | ..................... | G01N 33/24 |
| 2020/0219246 A1* | 7/2020 | Unno | ................... | G06V 20/188 |
| 2021/0271877 A1* | 9/2021 | Tran | ..................... | G05D 1/0088 |

FOREIGN PATENT DOCUMENTS

| | | | | |
|---|---|---|---|---|
| CN | 212116227 U | 12/2020 | | |
| DE | 4205094 A1 | 9/1992 | | |
| KR | 1816565 B1 * | 1/2018 | ............ | A01G 7/045 |
| KR | 101816565 B1 | 1/2018 | | |

* cited by examiner

Primary Examiner — Oneal R Mistry
Assistant Examiner — Jongbong Nah
(74) Attorney, Agent, or Firm — IKENEALY VAIDYA LLP

(57) ABSTRACT

Systems and methods are provided to assess light conditions at a location. The system can include a computer processor (CP) and a database. The database can store a grid map that includes a plurality of grid areas that segregate the location. The system can include a location sensor and a light sensor that generates sensor light. The CP can perform processing including: (1) determining that a sample event has been attained; (2) inputting sample data including location data and light data, (3) identifying, based on the location data, a grid area, of the plurality of grid areas, that corresponds to the location data; and (4) associating, based on the identifying, the sample with the grid area. The processing can further include (5) aggregating the sample with a previous sample that has been associated with the grid area; (6) generating a light value result based on the light level value and the previous light level value; and (7) applying the light value.

20 Claims, 19 Drawing Sheets

APPARATUSES AND METHODS FOR SUNLIGHT ASSESSMENT AT A LOCATION

BACKGROUND

The disclosed subject matter relates to methods and apparatuses that monitor the conditions of a location. More particularly, the disclosed subject matter relates to methods and apparatuses that monitor sunlight conditions on a lawn and related processing.

Manual tools, manually operated machines, powered tools and powered machines can be used to create and maintain a landscape for a residential property or a commercial property. The manual tools and machines can be referred to collectively as manual equipment and include, but are not limited to, rakes, shovels, hoes, aerator devices, pruning shears, pruning saws, clippers, weed trimmers, spreaders, tractors, other vehicles including all terrain vehicles, and lawnmowers. The powered tools and powered machines can be driven by an internal combustion engine or an electric motor or a hybrid of an internal combustion engine and an electric motor. The powered tools and machines can be referred to collectively as powered equipment or power equipment and include, but are not limited to, a string trimmer, a hedge trimmer, a power saw, a zero turn lawnmower, a tiller, a snowblower, and a garden tractor.

Residential property owners, property managers and commercial property owners can manage the care of the lawn and other vegetation forming the landscape of the property on their own or through a professional landscape service or both. Do-it-yourself ("DIY") lawncare can require the property owner/manager to invest in the purchase of any number of manual equipment and/or powered equipment. DIY lawncare can also require a substantial amount of time to perform the various tasks/duties required to achieve the desire aesthetics for the landscape of the property. Further, DIY lawncare can require the property owner/manager to perform repairs and preventative maintenance on the manual equipment and/or the powered equipment. The property owner/manager can perceive the repair and maintenance activates as an inconvenience or an undesirable obstacle for maintaining the desired aesthetics of the landscape.

As an alternative to DIY lawncare, a property owner/manager can employ the services of a professional landscaper to maintain the health and appearance of vegetation on the property at the desired level of aesthetics. A professional landscape service can have access to a wide variety of manual equipment and powered equipment that can permit the professional landscaper to execute the desired lawncare treatment more effectively and/or efficiently than the property owner/manager. However, the cost of the professional landscape services can outweigh the convenience to the property owner/manager.

SUMMARY

In accordance with an embodiment of the disclosed subject matter, a system to assess light conditions at a location is provided, the system can include a tangibly embodied computer processor (CP) and a tangibly embodied database, the CP implementing instructions on a non-transitory computer medium disposed in the database, and the database in communication with the CP, the system can further include: a communication portion for providing communication between the CP and a user device; the database that includes the non-transitory computer medium, and the database including the instructions, and the database storing a grid map that includes a plurality of grid areas that segregate the location; a location sensor that generates sensor location data based on physical location; a light sensor that generates sensor light data based on observed light; and the CP, and the CP performing processing including: determining that a first sample event has been attained; inputting, based on the determining that the first sample event has been attained, first sample data relating to a first sample, and the first sample data including first location data and first light data, (a) the first location data representing where the first sample was taken, and, (b) the first light data including a first light level value, the first location data is part of the sensor location data, and the first light data is part of the sensor light data; identifying, based on the first location data, a first grid area, of the plurality of grid areas, that corresponds to the first location data; associating, based on the identifying, the first sample with the first grid area; aggregating the first sample with a previous sample that has been associated, by the CP, with the first grid area, the previous sample including previous light data, and the previous light data including a previous light level value; the aggregating including generating a light value result based on the first light level value and the previous light level value; and applying the light value result to an operation for the location.

In accordance with another embodiment of the disclosed subject matter, a machine can be provided to service a location and to assess light conditions at the location, the machine including a mechanical service mechanism, a tangibly embodied computer processor (CP) and a tangibly embodied database, the CP implementing instructions on a non-transitory computer medium disposed in the database, and the database in communication with the CP, the machine can further include: a communication portion for providing communication between the CP and a user device; the database that includes the non-transitory computer medium, and the database including the instructions, and the database storing a grid map that includes a plurality of grid areas that segregate the location; a location sensor that generates sensor location data based on physical location; a light sensor that generates sensor light data based on observed light; and the CP, and the CP performing processing including: determining that a first sample event has been attained; inputting, based on the determining that the first sample event has been attained, first sample data relating to a first sample, and the first sample data including first location data and first light data, (a) the first location data representing where the first sample was taken, and, (b) the first light data including a first light level value, the first location data is part of the sensor location data, and the first light data is part of the sensor light data; identifying, based on the first location data, a first grid area, of the plurality of grid areas, that corresponds to the first location data; associating, based on the identifying, the first sample with the first grid area; aggregating the first sample with a previous sample that has been associated, by the CP, with the first grid area, the previous sample including previous light data, and the previous light data including a previous light level value; the aggregating including generating a light value result based on the first light level value and the previous light level value; and applying the light value result to an operation for the location.

In accordance with another embodiment of the disclosed subject matter, a method to assess light conditions at a location can be provided, the method can be performed by a system including a tangibly embodied computer processor (CP) and a tangibly embodied database, the CP implementing instructions on a non-transitory computer medium disposed in the database, and the database in communication with the CP, the method can include: storing the instructions in the database; storing a grid map in the database, the grid map including a plurality of grid areas that segregate the location; determining that a first sample event has been attained; inputting, based on the determining that the first sample event has been attained, first sample data relating to a first sample, and the first sample data including first location data and first light data, (a) the first location data representing where the first sample was taken, and, (b) the first light data including a first light level value; identifying, based on the first location data, a first grid area, of the plurality of grid areas, that corresponds to the first location data; associating, based on the identifying, the first sample with the first grid area; aggregating the first sample with a previous sample that has been associated, by the CP, with the first grid area, the previous sample including previous light data, and the previous light data including a previous light level value, the aggregating including generating a light value result based on the first light level value and the previous light level value; and applying the light value result to an operation for the location.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

Figure 1:
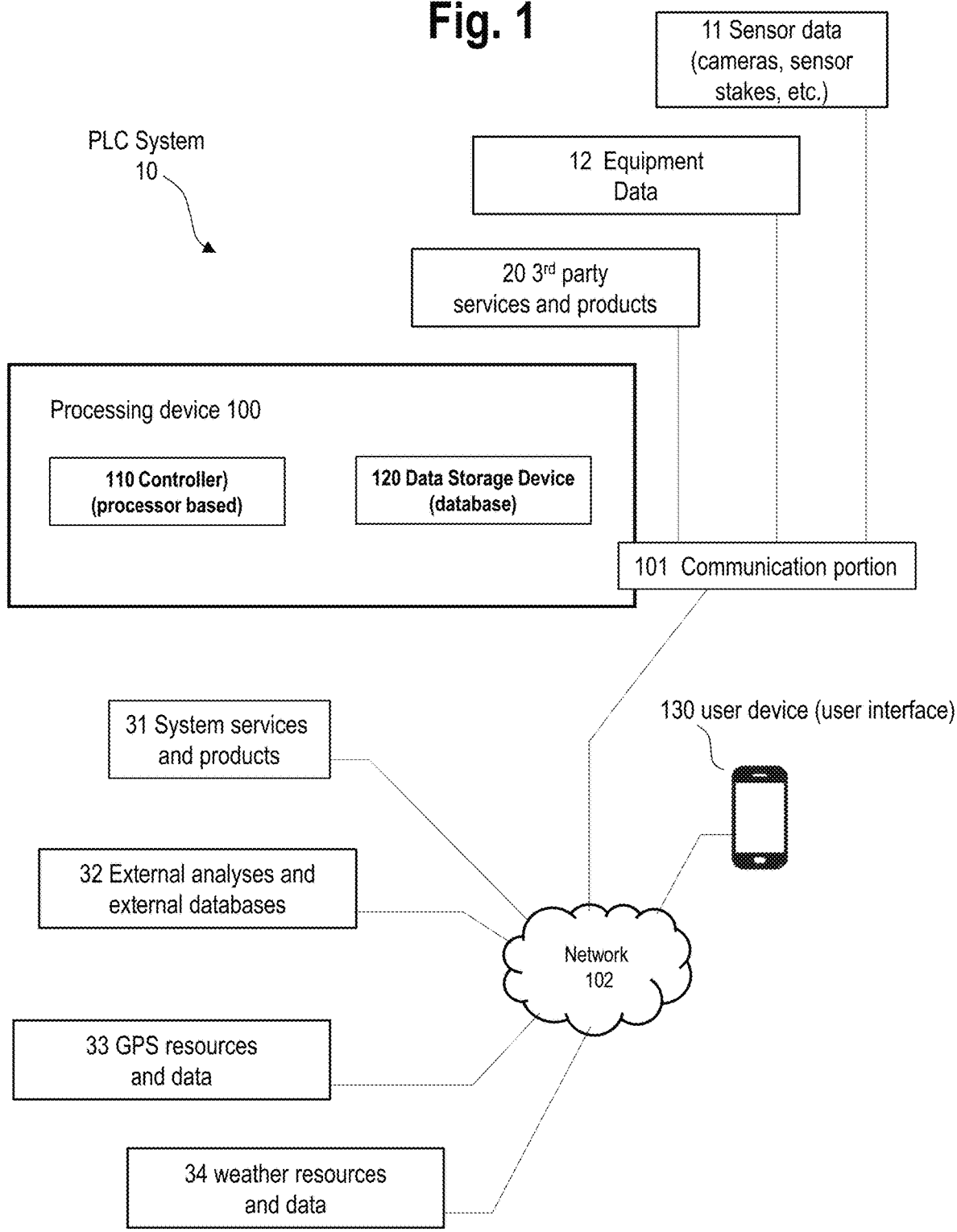
FIG. 1 is a schematic view of a prescriptive lawncare system made in accordance with principles of the disclosed subject matter.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

In addition to routine cutting, trimming, and pruning the vegetation that forms a property landscape, other maintenance of the landscape can include watering, chemical treatment, fertilizing, seeding, aeration and/or dethatching. A property owner/manager can completely lack experience in basic lawncare or have very limited experience with lawncare. Further, a property owner/manager can completely lack or have only a basic understanding for diagnosing the health of the property's landscape and/or how to effect treatment of the landscape to improve or maintain the health of the landscape. Thus, there is a need for a prescriptive lawncare service that can help a property owner/manager to diagnose the current health of the property's landscape, maintain the health, modify the landscape to improve appearance and/or achieve the desired aesthetics, and perform the routine maintenance such as but not limited to cutting of the lawn. One variable, if known, can significantly assist in developing and implementing a treatment or prescriptive plan for a particular piece of property: the amount and timing of sunlight.

Sunlight is a key component in ensuring the proper growth and health of grass (and other vegetation). Highly shaded areas may require shade tolerant grass varieties, or an alternative landscaping solution. Typically, property owners monitor the issue over time to develop an understanding of what areas are shaded. Accurate monitoring can be difficult because the position of the sun is always changing, hourly, daily, and seasonally. In accordance with an embodiment of the disclosed subject matter, a stationary or mobile sunlight sensor measures the light available in a given area. The sensor may be mounted to a tool or machine, such as a lawnmower. The device would account for changing sun locations by measuring the shade providing structures and plants, or utilizing sensed data from different times to develop a full picture of the sunlight that is available. The data can be merged to provide a map of available sunlight at that particular location. The disclosed subject matter can also be directed to a standalone system (not associated with a tool or machine) for finding areas where the sun does and does not shine over time.

The disclosed subject matter can include a system 10 that takes into account the time of year to determine where sunlight and the amount of it will come in. In particular, the system 10 can include sensors and devices that detects objects and sunlight shadows. For example, stereocamera or lidar technology as explained in more detail below can be used to measure objects around it plants and structures to detect sunlight and shadows over time at a particular location. The system 10 can be stationary or mobile and can be configured to detect reflections that concentrate sunlight (e.g., sunlight reflected from windows). The system 10 can also be configured to take measurements at different times and different time increments depending on a user's desire for accuracy, and can be configured to determine what is natural light compared to what is reflective light impinging upon a particular location.

The system 10 can include links to an irrigation device that can causes watering at a particular location depending on the data related to sunlight obtained by the system 10. Thus, if hot spots are known, watering can occur at different timing and different amounts to combat burns attributed to such hot spots. In other words, the system 10 can be designed and/or programmed to infer where to place more water. Such functionality can be desirable because water conservation is an important issue for land owners as well as the general public. Conservation of water can be achieved through use of the system 10 which can provide accurate and timely information related to the actual amount of sun that reaches particular locations of property. On a large college campus or golf course, etc., more specific sunlight data allows for large benefits in water conservation. In addition, the system 10 can recommend different grass varieties based on the light, and can recommend completely different landscaping (e.g., do not try to grow grass at this location".)

FIG. 1 is a schematic illustration of a prescriptive lawncare system ("PLC system") 10 that can provide property owners/managers and professional landscapers with information about a relevant landscape, formulate a treatment plan for the landscape, recommend service(s) and equipment for executing the treatment plan, and/or provide instructions for executing the treatment plan. The PLC system 10 can include data processing device or system 100 (hereinafter "processing device 100"), sensor data 11, equipment data 12, and other processing and/or data resources. The PLC system 10 can include third party services and systems 20 that can include external services and systems. The PLC system 10 can include system services and products 31, external analyses and external database resources 32, global positioning satellite ("GPS") resources and data 33, and weather resources and data 34.

The processing device 100 can include a communication portion 101, a processor-based controller 110, and a data storage device 120.

The communication portion 101 can be electrically connected and in communication with the various components of the PLC system 10, as shown in FIG. 1. Such electrical connection and communication can be provided over a network 102 or over some other communication mechanism or arrangement.

FIG. 1 schematically illustrates respective lines or communication lines connecting the communication portion 101 to each of the data inputs 11, 12, the providers 20, 31, 32, 33, 34, and the user interface 130. These lines can schematically represent a wired connection or a wireless connection. The electrical communication can be over a local computer network, or over the internet, or over a cellular network, or any combination these networks or over some other communication mechanism. The electrical communication can be over network 102, as shown in FIG. 1. The communication portion 101 can pass data and/or information between the controller and each of the data inputs 11, 12, the providers 20, 31, 32, 33, 34, and the user interface 130.

The sensor data 11 can include data indicative of the color and density of a lawn, the moisture content, sunlight exposure, and other attributes. The sensor data 11 can be obtained by any appropriate device(s) such as but not limited to a camera, sensor stakes, Lidar, radar, moisture detectors, photoresistors, light-dependent resistors (LDRs), sensors that capture the instantaneous flux of photons ($\mu$mol m$^{-2}$ s$^{-1}$) with wavelengths in the PAR range, etc.

The equipment data 12 can include the type of lawncare equipment that is owned by the property owner/manager, the type of lawncare equipment owned by one or more neighbors, and/or the type of lawncare equipment being used on the property or location by a professional landscape service. The equipment data can include data indicative of handheld tools, walk-behind machines, and ride-on machines. The equipment data can include attributes of the equipment including whether the equipment is manually operated, powered by an internal combustion engine, powered by an electric motor, or powered by a hybrid of an internal combustion engine and electric motor. The equipment data can include data indicative of the hours of operation, the maintenance schedule, completed maintenance, etc., for each piece of equipment.

The user interface 130 can be in the form of a user device 130. The user interface can be any appropriate electronic device, such as, but not limited to, a cellular (mobile) telephone, a tablet computer, a laptop computer, a desktop computer, a server terminal, a graphic user interface built into a machine or tool, or other device that permits a user to input requests for information to and receive information generated by the processing device 100.

The GPS resources and data 33 can include satellite image(s) of the property and neighboring properties, street level image(s) of the property and neighboring properties, map data of the property and neighboring properties, and address information of the property and neighboring properties. Any number of user interfaces 130 can be in electrical communication with the processing device 100.

The weather resources and data 34 can include data indicative of temperature (daily highs and lows, averages, maximums, minimums, current) precipitation amounts, amount of sunshine (average, maximums, minimums, current). The weather data 34 can be obtained from a service provider or government agency.

In general, inputs into the processing device 100 can be electrically connected to data sources such as, but not limited to, a soil sample analysis, geographic information, lawn scan and mapping data, and regulation/ordinance information. Data representing soil sample analysis can be provided by a third party or determined by the controller 110 using data output by a soil analysis apparatus in electrical communication with the controller 110, where the output data is based on a soil sample introduced to an analysis apparatus by the user. Lawn scan and mapping data can be based on data obtained from, but not limited to, a formal land survey, satellite imagery, a digital image scan of the landscape, and government agency(ies) such as the U.S. Geological Survey and U.S. Department of Agriculture. Regulation/ordinance information can be obtained from any appropriate local, regional or national government agency or from a subscription database of local, regional and national regulations and ordinances.

The processing device 100 can generate outputs, through electrical communication, to the user interface 130 and the service and/or equipment providers. The processing device 100 can output a treatment plan and/or other information requested by the user and can output requests or notifications to the service and/or equipment providers based on the treatment plan and/or other information requested by the user.

The processor-based controller ("controller") 110 can be a physically embodiment of a machine referred to as an electronic computing device such as but limited to an electronic control unit ("ECU"), a central processing unit ("CPU"), a microcontroller, a microcomputer, a server, a plurality of electronic computing devices or servers, or other appropriate processor-based controller(s) that can receive data inputs, execute commands for processing the data inputs, and output a treatment plan based on executed commands. The controller 110 can be configured with hardware alone or in combination with software to execute commands that process the data inputs and output any of a plurality of lawncare treatment plans in accordance with the disclosed subject matter. The controller 110 can be referred to as a product and service recommendation engine 110.

For example, the controller 110 can be configured to interact with the user interface 130 and permit a user to request a fertilizer plan for the landscape. The controller 110 can be configured to determine a fertilizer content and schedule based on data input by the user and data input from any appropriate data input(s). In another example, the controller 110 can be configured to permit the user to request a sunlight evaluation of the landscape based on measured sunlight data input to the controller 110 and recommend a treatment plan for the landscape based on the processed sunlight data. In yet another example, the controller 110 can be configured to permit the user to request an evaluation of the grade of the lawn and output a recommended adjustment of the grade and provide the user with instructions and recommendations on how to achieve the recommended grade. In yet another example, the controller 110 can be configured to permit the user to request a soil analysis of the landscape, recommend a treatment plan for the landscape soil, and provide a water run-off analysis after the user implements the treatment plan. In yet another example, the controller 110 can be configured to permit the user to select a desired aesthetic appearance of the landscape, recommend a treatment plan that can achieve the desired aesthetic appearance, and rank the recommended treatment plan according to predetermined parameters such as but not limited to difficulty, cost, equipment availability. The controller 110 can be in electrical communication with each of the data inputs 11, 12, the providers 20, 31, 32, 33, 34, and the user interface 130.

The data storage device 120 can be any appropriate non-transitory recording or storage medium such as, but not limited to, a CD-ROM, a DVD-ROM, a hard drive, a RAM, a ROM, a floppy disc, and a magnetic tape cassette, or later developed medium such as, but not limited to, transitory recording medium, or carrier waves. The data storage device 120 can include some or all of the software that is executed by the controller 110 in order to provide the treatment plan(s) requested by the user. The data storage device 120 can store data created by the controller 110 that is indicative of the one or more parameters of a landscape, lawn or location such as, but not limited to, grade, type(s) and location(s) of the vegetation, water-run-off analysis, scanned images, map information, soil analysis, coloration of the vegetation, chemical analysis of the vegetation. These parameters can be referred to as the digital lawn.

A provider of the PLC system 10 can be a manufacturer of lawncare equipment. The system services and products 31 can include lawncare products manufactured by the manufacturer, other service(s) on offer by the manufacture and other products available from the manufacturer. The processing device 100 can communicate with the system services and products 31 to provide the user with suggested equipment, sales information, and other services/products. The sales information can include the location of a lessor, retailer or dealer of the suggested equipment. The controller 110 can be configured to send a message to the lessor, retailer or dealer indicative of the user's desire of or inquiry regarding the suggested equipment so that the lessor, retailer or dealer can initiate contact with the user about a possible sale or lease of the suggested lawncare equipment.

The manufacturer of lawncare equipment and provider of the PLC system 10 can also offer other services such as, but not limited to, professional landscaping, professional lawncare maintenance, and other products such as, but not limited to, portable generators, cars, pick-ups, sports-utility vehicle, cross-over vehicle, vans, motorcycles, all-terrain vehicle, outboard motors, and aircraft. The controller 110 can be configured to provide the user with information regarding any of the other products or offerings from the manufacture.

The external services and products 20 can be any third party entity not affiliated with the provider of the PLC system 10 such as, but not limited to, a manufacturer of fertilizer, a professional landscaper, or a rental company that leases lawncare equipment. The controller 110 can be configured to provide the user and any component of the external services and products 20 with information about each other. For example, the controller 110 can be configured to output a message to a professional landscaper that indicates that the user is interested in hiring a professional landscaper. The controller 110 can be configured to obtain information from the landscaper such as cost, services provided and equipment used and provided this information to the user via the user interface or user device 130. For example, the landscaper can have traditional lawncare equipment that is operated by a designated person, or automated lawncare equipment that is operated remotely or fully autonomous.

Figure 2:
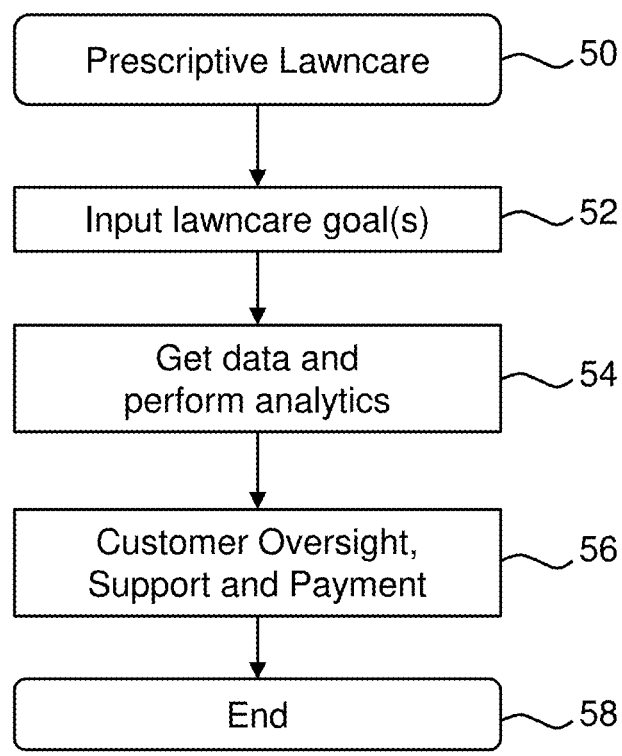
FIG. 2 is flowchart that outlines the general operation of the prescriptive lawncare treatment system of FIG. 1 in accordance with principles of the disclosed subject matter.

FIG. 2 is flowchart illustrating the general operation of the controller 110. At step 50, the user can initiate a prescriptive lawncare service session with the controller 110 via the user interface 130. The processing performed by the controller 110 can then move to step 52.

At step 52, the controller 110 can be configured to prompt the user to input one or more lawncare goals for the property or location. The controller 110 can be configured to move to step 54 when the user has entered desired goals to the controller 110 via the user interface 130.

At step 54, the controller 110 can be configured to access all of the data inputs 11, 12, the providers 20, 31, 32, 33, 34, and the user interface 130, that are appropriate to generate a treatment plan in accordance with the user's goal(s). After obtaining the data, the controller 110 can be configured to analyze the obtained data in accordance with predetermined processing, computations and comparisons. After completing the analysis, the controller 110 can move to step 56.

At step 56, the controller 110 can be configured to generate and output a treatment plan based on the analysis performed in step 54. The controller 110 can be configured to prompt the user to request or decline supplemental information regarding the treatment plan. The supplemental information can include information from the system services and products 30, information from the external services and products 40, instructions on how to execute the treatment plan, frequently asked questions ("FAQs") related to the treatment plan, etc. At step 56, the controller 110 can be configured to accept payment from the user for the treatment plan and for any services and products ordered for the execution of the treatment plan.

After completing the payment(s), the controller 110 can be configured to end the prescriptive lawncare service session.

As an example of the execution of the flowchart of FIG. 2, the user can select a set a specific goal of the lawn at step 52 that indicates a lush, thick grass lawn. The controller 110 can execute one or more subroutines at step 54 that are predetermined for use in generating a treatment plan directed toward a lush, thick lawn. The subroutine(s) executed at step 54 can include steps to obtain data regarding the type of grass on the property, historical rainfall and temperature data for the property, grade of the lawn on property, historical sunlight data from the property, and soil analysis data for the property, and ordinances and regulations regarding chemical treatments to land in the jurisdiction of the property. The controller 110 can output a treatment plan at step 56 that includes the application of fertilizer and a list of chemical(s) that are permitted by ordinance/regulation for the property. and retailers of the permitted chemical(s). The controller 110 can be configured to prompt for and accept payment for the treatment plan and any chemical(s) order using the PLC system 10.

Hereinafter, further inventive aspects of the disclosure will be described with reference to FIGS. 3-19.

Figure 3:
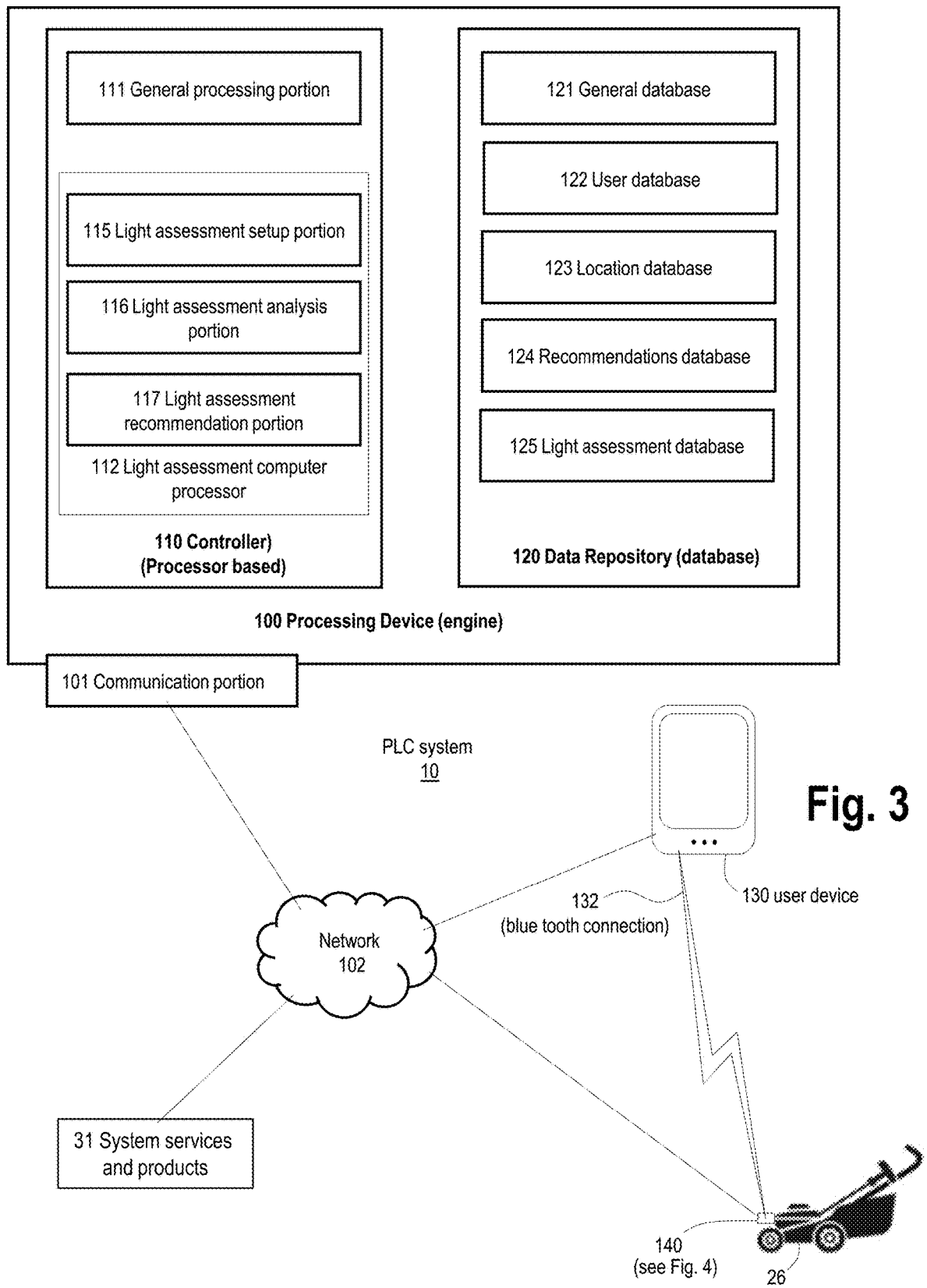
FIG. 3 is a block diagram showing further details of the processing device shown in FIG. 1, in accordance with principles of the disclosed subject matter.

FIG. 3 is a block diagram showing further details of the processing device shown in FIG. 1, in accordance with principles of the disclosed subject matter. Accordingly, FIG. 3 illustrates further details of the PLC system 10. The processing device 100 can include controller 110 and data repository 120, as described above. The controller 110 can include a general processing portion 111. The general processing portion 111 can handle overall and more general processing of the processing device 100. The controller 110 can also include a light assessment processor 112. The light assessment processor 112 can perform processing to provide various functionality related to light assessment, as described in detail below.

The light assessment processor 112 can include a light assessment setup portion 115, a light assessment analysis portion 116, and a light assessment recommendation portion 117. Further details of such processing portions are described below.

The data repository 120 or database 120 can include various databases or sub databases. The database 120 can include a general database 121, a user database 122, a location database 123, a recommendations database 124, and a light assessment database 125. The general database 121 can store various data related to overall operations of the processing device 100, including data utilized and generated by the controller 110. The user database 122 can store various data associated with users who utilize the processing device 100. The location database 123 can store various data related to locations that are serviced by or processed by the processing device 100. For example, such a location might be a lawn at a user's place of residence. The recommendations database 124 can store various data to map observed attributes into recommendations. Such recommendations can then be output to the relevant user. The light assessment database 125 can store various data utilized by and generated by the light assessment processor 112. For example, the light assessment database 125 can store data related to observed light conditions at a location over time.

As illustrated in FIG. 3, and described above, the PLC system 10 can include a user device 130. The user device can provide a user interface. The PLC system 10 can also include what is described herein as a light assessment system (LAS) 140. The LAS 140 can be mounted on a machine 26. As illustratively shown in FIG. 3, the machine 26 can be a lawnmower. The LAS 140 can be in communication with the processing device 100 via the network 102. Relatedly, the LAS 140 can be in communication with the light assessment processor 112, over the network 102. In general, any of the processors and databases described herein can be in communication with each other over a suitable network or over some other mechanism. The LAS 140 can also be in communication with the user device 130. Communication between the LAS 140 and the user device 130 can be performed via the network 102. Communication between the LAS 140 and the user device 130 can be performed using some other communication mechanism, such as via a Bluetooth connection. That is, in processing as described herein, the LAS 140 may well be physically proximate the user device 130. Accordingly, a Bluetooth connection or local network or communication protocol can be utilized to connect the LAS 140 to the user device 130.

Figure 4:
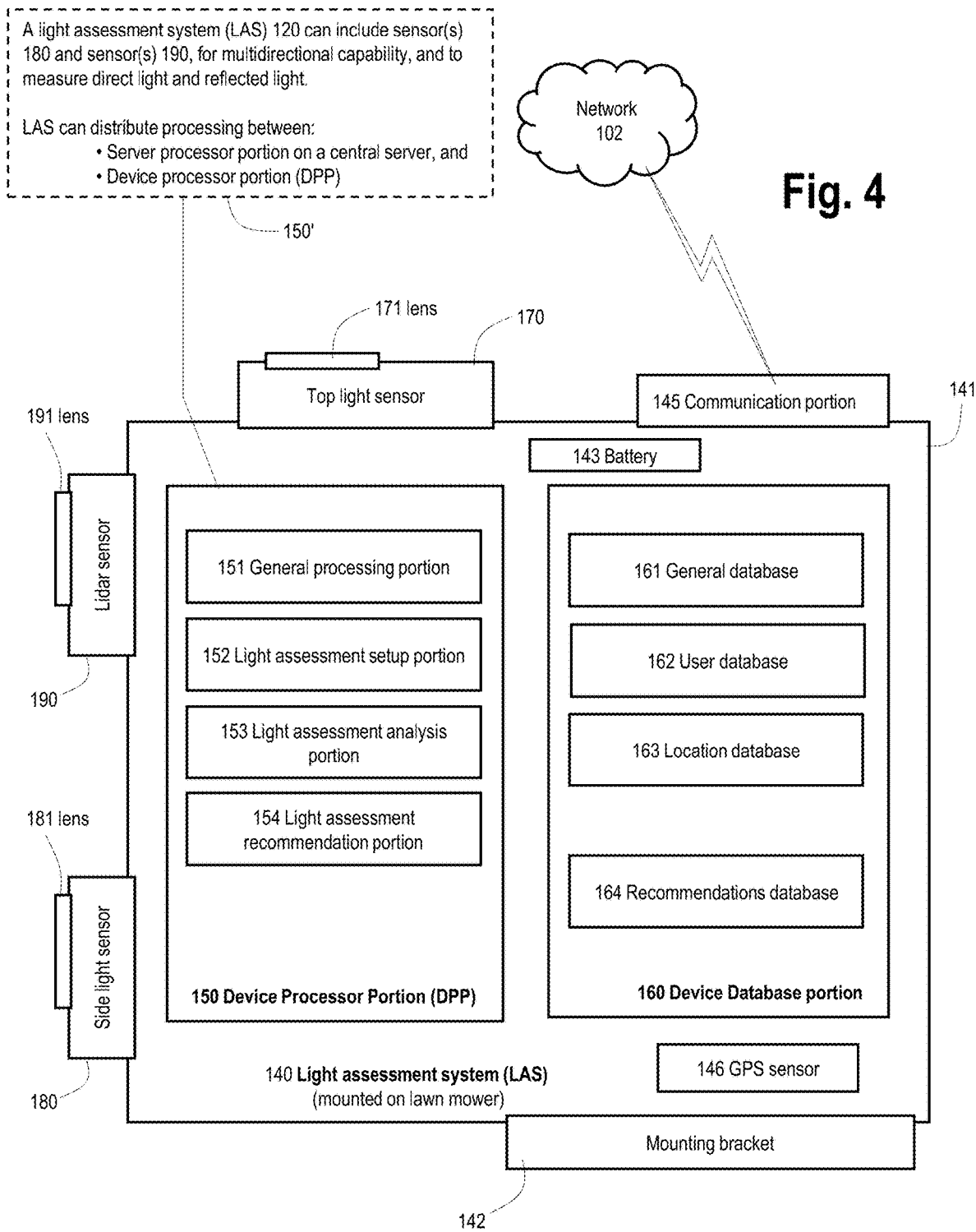
FIG. 4 is a block diagram showing details of an illustrative light assessment system (LAS), in accordance with principles of the disclosed subject matter.

FIG. 4 is a block diagram showing details of an illustrative LAS 140. The LAS 140 can include a plastic housing or casing 141 that is physically mounted on a lawnmower or other machine 26. The housing 141 can be constructed of plastic or some other moisture and weather resistant material so as to protect various electrical components stored within the housing 141. The housing 141 of the LAS 140 can be attached onto a lawnmower using a mounting bracket 142. For example, the mounting bracket 142 can be integrated into the housing 141 of the LAS 140. The mounting bracket can include holes or apertures so as to bolt onto the lawn mower 26. The lawn mower 26 can have apertures or holes so as to accept such attachment. Accordingly, the LAS 140 can be securely attached onto the lawnmower or other machine 26. As described further below, it can be preferable to attach the LAS 140 onto the machine 26 such that the LAS 140 is exposed to ambient light both from above and from the sides of the LAS 140. If needed, an extension bracket or extender bracket can be utilized so as to support the LAS 140 at some height above the deck of the lawnmower, for example, such that the LAS 140 can observe ambient light.

The LAS 140 can also include a device processor portion (DPP) 150, i.e., a computer processor dedicated to light assessment, and a device database portion 160, i.e., a database 160. The DPP 150 can be in the form of or include a computer processor (CP) or other processing component as described herein. The DPP 150 can include a general processing portion 151 that performs general processing of the LAS 140. The DPP 150 can include a light assessment setup portion 152 that can perform various processing to "set up" a user and/or location for use of the LAS 140. The DPP 150 can include a light assessment analysis portion 153. The light assessment analysis portion 153 can provide core light assessment processing such as analyzing light data over time, associating light values that are input with a particular geographical area or "grid area" as described below, and various other related processing described herein. The light assessment recommendation portion 154 can provide various functionality to input data and provide recommendations based on such input data. The processing portions of the DPP 150 can be paralleled or correspond to processing portions in the light assessment processor 112. As otherwise described herein, the light assessment processor 112 can be in the form of or include a computer processor (CP) or other processing component.

In similar manner to the database 120 of the processing device 100, the device database portion or database 160 can include a general database 161, a user database 162, and a location database 163. The general database 161 can hold various data used by more general processing of the LAS 140. For example, the general database 161 can hold data and protocols regarding the data interface of the various components of the LAS 140. The user database 162 can hold various data regarding the user of the LAS 140. For example, the user database 162 can hold particulars and attributes of the user device 130 to which the LAS 140 typically interfaces. Illustratively, the LAS 140 might be utilized by an individual homeowner. In such a situation, the user database may primarily contain data relating to that sole user. However, in other situations such as an industrial use of the LAS 140, the user database 162 can store attributes of a variety of users. The user database 162 can store preferences that can be set by a particular user or users.

The database 162 also contains the location database 163. The location database 163 can store various data relating to locations at which the LAS 140 is utilized. It may be that the LAS 140 is owned by an individual homeowner and that the location database 163 primarily only holds data regarding a single location at which the LAS 140 is utilized. Alternatively, the LAS 140 can be used at numerous locations and the location database 163 contain data regarding all of such locations. The database 162 can also include a recommendations database 164. The recommendations database 164 can store data utilized by and generated by the light assessment recommendation portion 154.

The LAS 140 can also include a communication portion 145. The communication portion 145 can provide communication between the network 102 and the user device 130, for example. As otherwise described herein, such communication can be over a network or utilizing a local network or communication protocol, for example. The communication portion 145 can include an antenna, for example. The LAS 140 can also include a battery 143. The battery 143 can provide power so as to power the various components of the LAS 140. The battery 143 can be a rechargeable battery or exchangeable (for a new battery) upon exhaustion of the battery. Any system, device, apparatus or other construct described herein can be provided with a suitable power source.

Notably, the LAS 140 can include various light sensors. As noted at 150', a LAS 140 can include sensor(s) 180 and sensor(s) 190, for multidirectional capability, and to measure direct light and reflected light. That is, a top light sensor 170 can be provided to primarily measure direct sunlight from the sun in conjunction with the machine 26 being used at a particular location. The side light sensor 180 can be provided to primarily measure reflected sunlight. In general, the LAS 140 can be provided with various light sensors and related structure. For example, the side light sensor 180 could be provided with a shading cover or be recessed into the housing 141, so as to protect the side light sensor 180 from direct sunlight. Such arrangement may be helpful in better assessing reflected light versus direct sunlight. Light sensors can be provided on all 4 sides or all sides of the LAS 140, for example. Also, as noted above, the LAS 140 can be positioned relative to the machine so as to be exposed to ambient light.

The top light sensor 170 can include a lens 171. The side light sensor 180 can include a lens 181. The light sensors of the LAS 140 can be provided with various other related structure, such as a protective cover that might be positioned over a lens when the LAS 140 is not in use. Known light sensors can be utilized that input a light value and output data to the DPP 150 that represents such input light value.

As noted at 150', the LAS 140 can distribute processing between various processing resources that are available to the LAS 140. For example, the light assessment processor 112 of the controller 110 can be utilized by the DPP 150 as a processing resource. In general, the server processor portion, server, or other processing entity on a central server might be utilized by the DPP 150. Accordingly, processing as described herein can be distributed over multiple processing resources, as well as over multiple database resources. For example, functionality described below might primarily be performed by the DPP 150, with some subroutines are processing components performed by the light assessment processor 112.

The LAS 140 can also be provided with a GPS sensor or device 146. The GPS sensor 146 can provide GPS or other location data. Known GPS sensors and devices can be utilized that input a GPS position or other position data, and output data to the DPP 150 that represents such GPS position or other position.

Figure 5:
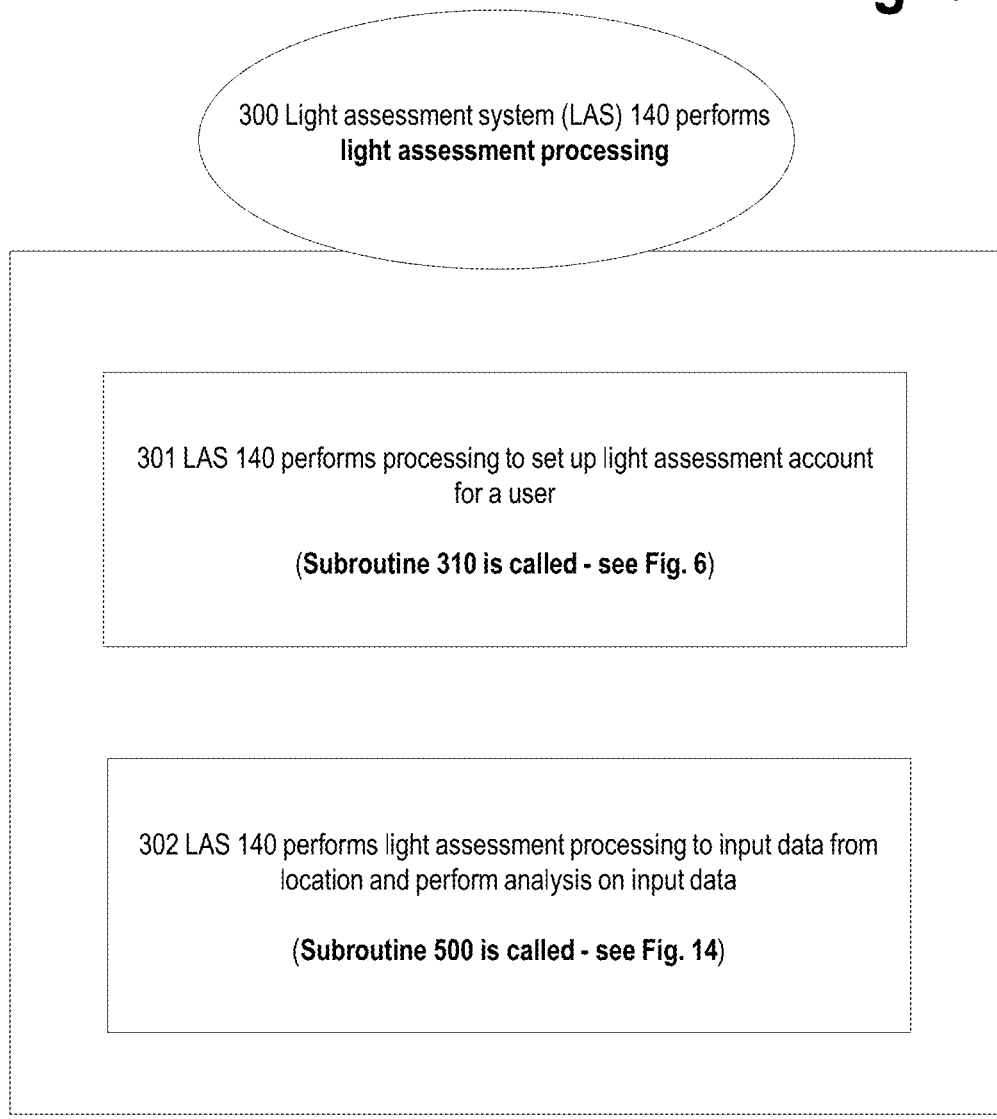
FIG. 5 is a high-level flowchart showing processing that can be performed by the light assessment system (LAS), and more specifically by a device processor portion (DPP) of the LAS, in accordance with principles of the disclosed subject matter.

Hereinafter, further details will be provided regarding the LAS 140 and the various functionality provided by the DPP 150. FIG. 5 is a high-level flowchart showing processing that can be performed by the LAS 140, and more specifically by the DPP 150. As reflected in step 300, the LAS performs light assessment processing, in accordance with principles of the disclosed subject matter. The processing of step 300, shown in FIG. 5, can include various processing components including processing of step 301 and processing of step 302. In step 301, the LAS 140 performs processing to set up a light assessment account for a user. To perform such processing, a subroutine 310 can be called or invoked. Details of subroutine 310 are described below with reference to FIG. 6. In step 302, the LAS performs light assessment processing to input data from a location and perform analysis on the input data. To perform such processing, a subroutine 500 can be called or invoked. Details of subroutine 500 are described below with reference to FIG. 14. The processing of steps 301, 302 can be initiated by interfacing with a user, and more specifically with a user device 130. The processing of steps 302, 302 may be initiated by some other observed event or triggering event.

Figure 6:
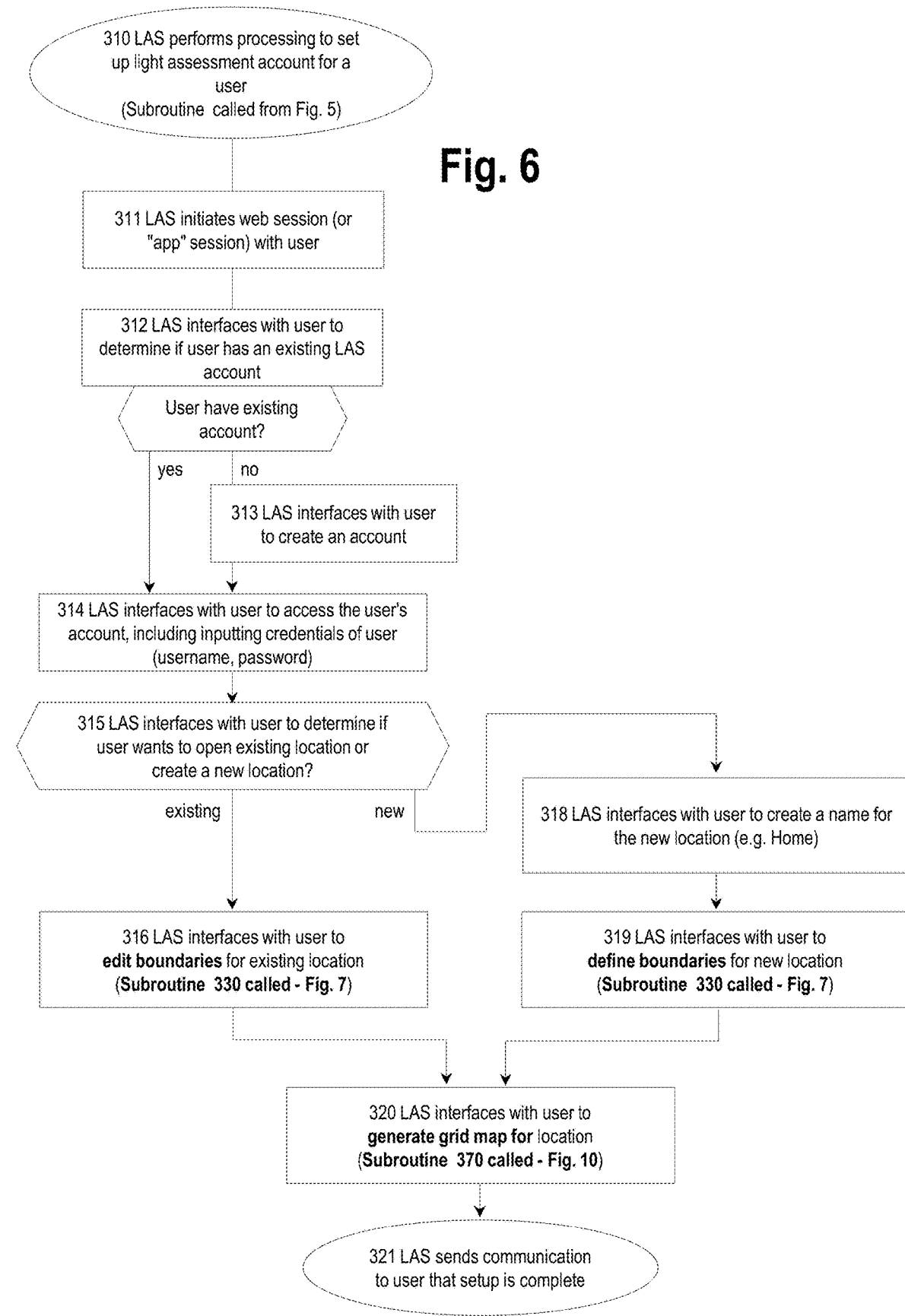
FIG. 6 is a flowchart showing details of "LAS performs processing to set up light assessment account for a user" of subroutine 310, in accordance with principles of the disclosed subject matter.

FIG. 6 is a flowchart showing details of "LAS performs processing to set up light assessment account for a user" of subroutine 310, in accordance with principles of the disclosed subject matter. The processing of subroutine 310 is initiated and passes onto step 311. In step 311, the LAS initiates a web session with the user. Alternatively, an "app" session could be initiated with the user. As otherwise described herein, the user can be constituted by or include the user device 130. Then, in step 312, the LAS interfaces with the user to determine if the user has an existing LAS account. If no, then in step 313, the LAS interfaces with the user to create an account. Then, the process passes onto step 314. Alternatively, if yes in step 312, then the processing passes directly to step 314.

In step 314, the LAS interfaces with the user to access the user's account, including inputting credentials of the user. Then, the process passes onto step 315. In step 315, the LAS interfaces with user to determine if the user wants to open an existing location or create a new location. That is, step 315 relates to what location, such as a physical lawn of a homeowner, that the user wants to assess or perform processing upon. If the user wants to open an existing location, then the process passes onto step 316. In step 316, the LAS interfaces with the user to edit boundaries for the existing location, for example. Other processing dedicated to an existing location can be performed. To perform step 316, subroutine 330 can be called. Further details of subroutine 330 are described below with reference to FIG. 7. On the other hand, the user may want to open a new location. For example, with a commercial user, it may be more common to open a new location since the commercial user deals with numerous locations in a routine day. On the other hand, a homeowner may routinely only deal with a single location, i.e., their own personal lawn.

If the user wants to open a new location, in the processing of step 315, then the process passes to step 318. In step 318, the LAS interfaces with user to create a name for the new location. Then, in step 319, the LAS interfaces with user to define a boundary for the new location. The processing of step 319 can also be performed by subroutine 330 as described below with reference to FIG. 7.

Accordingly, after either of step 316 or step 319, the processing passes onto step 320. In step 320, the LAS interfaces with the user to generate a grid map for the location. The processing of step 320 can be performed by subroutine 370, as described below with reference to FIG. 10. After step 320, the process passes onto step 321. In step 321, the LAS outputs communication to the user that the set up is complete.

Figure 7:
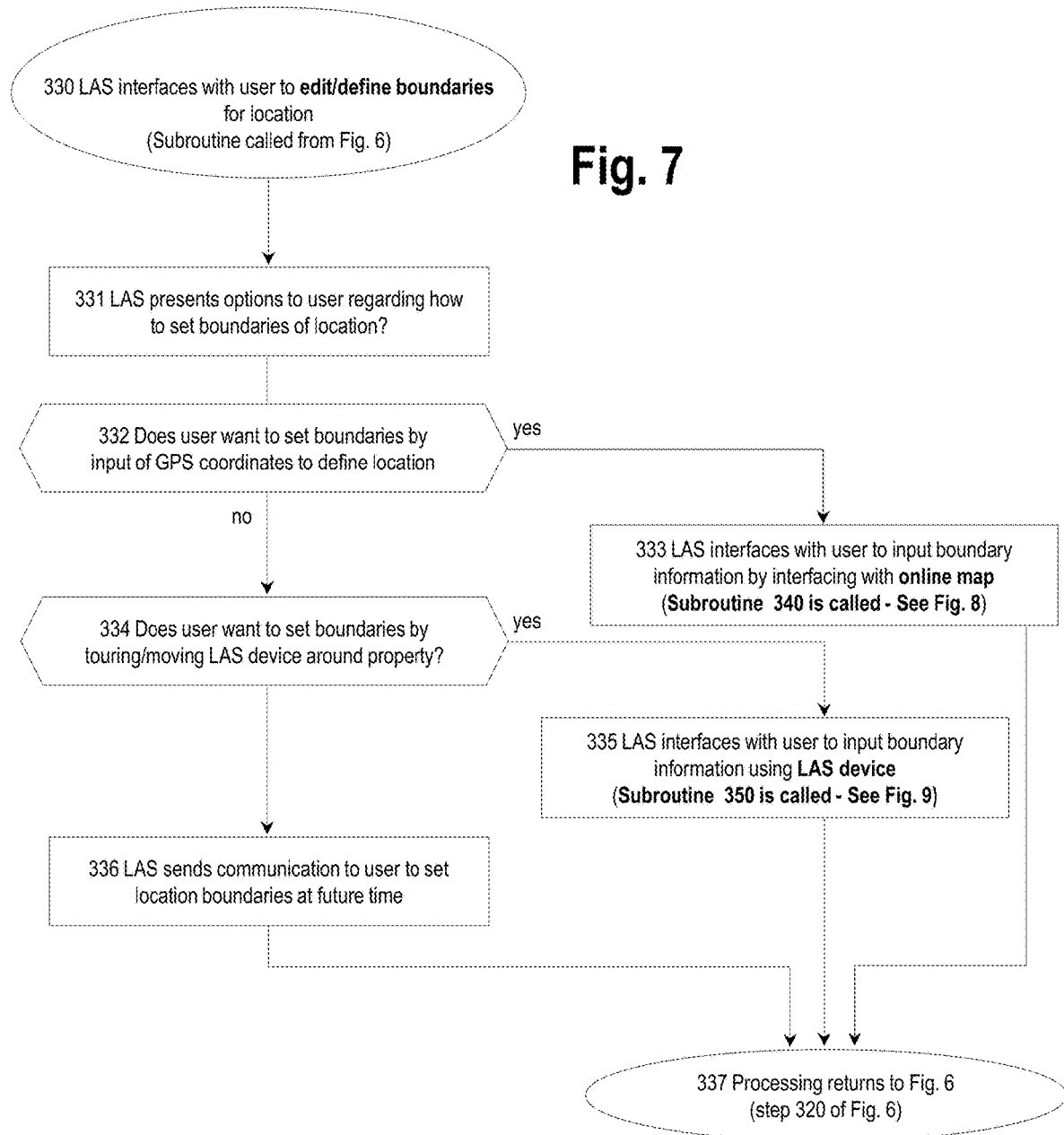
FIG. 7 is a flowchart showing details of "LAS interfaces with the user to edit/define boundaries for location" of subroutine 330, in accordance with principles of the disclosed subject matter.

FIG. 7 is a flowchart showing details of "LAS interfaces with the user to edit/define boundaries for location" of subroutine 330. Such subroutine 330 can be called from the processing of FIG. 6. The subroutine is initiated and passes onto step 331. In step 331, the LAS presents options to the user regarding how to set boundary or boundaries for the location. To explain, the location could be a lawn of a homeowner, i.e., a physical lawn of the homeowner at the homeowner's place of residence. In accordance with an embodiment, to perform light assessment processing, the LAS 140 needs to understand and determine the physical extents of the location or, in other words, the boundary of the location. The processing of FIG. 7 relates to such determination of the boundary of a location. In step 331, the options can be presented to the user via a suitable user interface on the user device 130. Illustratively, options can be presented to the user including whether the user wants to set boundary of a location by input of GPS coordinates to define the location. Alternatively, the user might want to set boundary of a location by touring or physically moving the LAS 140 about the location, i.e., about the lawn. For example, the lawn might include 4 corners. The boundary of the lawn might be input, as described below, by physical positioning of the LAS 140 at each of the 4 corners.

Accordingly, in step 332, the LAS determines if the user wants to set boundaries by input of GPS coordinates to define the location. If yes, then the process passes onto step 333. In step 333, the LAS interfaces with user to input boundary information by interfacing with an online map, in accordance with this embodiment of the disclosure. The processing of step 333 can be performed by subroutine 340. Subroutine 340 is described below with reference to FIG. 8.

On the other hand, if a no determination is rendered in step 332, the processing may pass onto step 334. In step 334, the LAS determines if the user wants to set boundary of the location by touring the LAS around the property, i.e., around the location or lawn. If yes, then the process passes onto step 335. In step 335, the LAS interfaces with user to input boundary information using the LAS 140. Such processing can be performed by subroutine 350, which is described below with reference to FIG. 9.

If a no determination is rendered in step 334, then the process passes onto step 336. In step 336, the LAS sends a communication to the user to set the location boundary at a future time. That is, in this example, it may be that the only mechanisms to set boundary of a location are provided by the processing of step 333 and 335. Accordingly, an option can be provided to the user to set the boundary of the location at a future time. After any of steps 336, 333, and 335, the process passes onto step 337. In step 337, the processing returns to FIG. 6, and specifically passes onto step 320 of FIG. 6.

Figure 8:
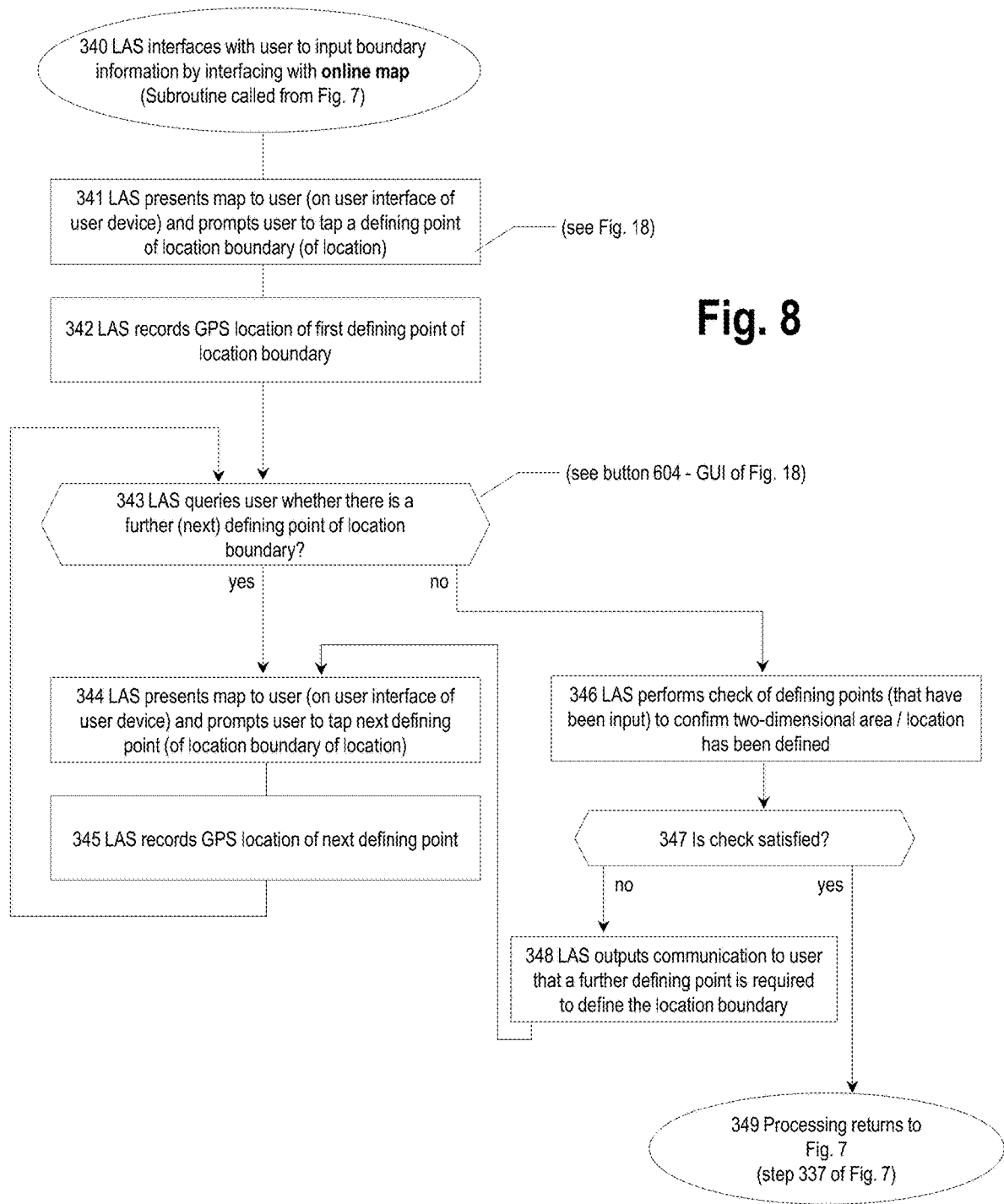
FIG. 8 is a flowchart showing details of "LAS interfaces with user to input boundary information by interfacing with online map" of subroutine 340, in accordance with principles of the disclosed subject matter.
Figure 18:
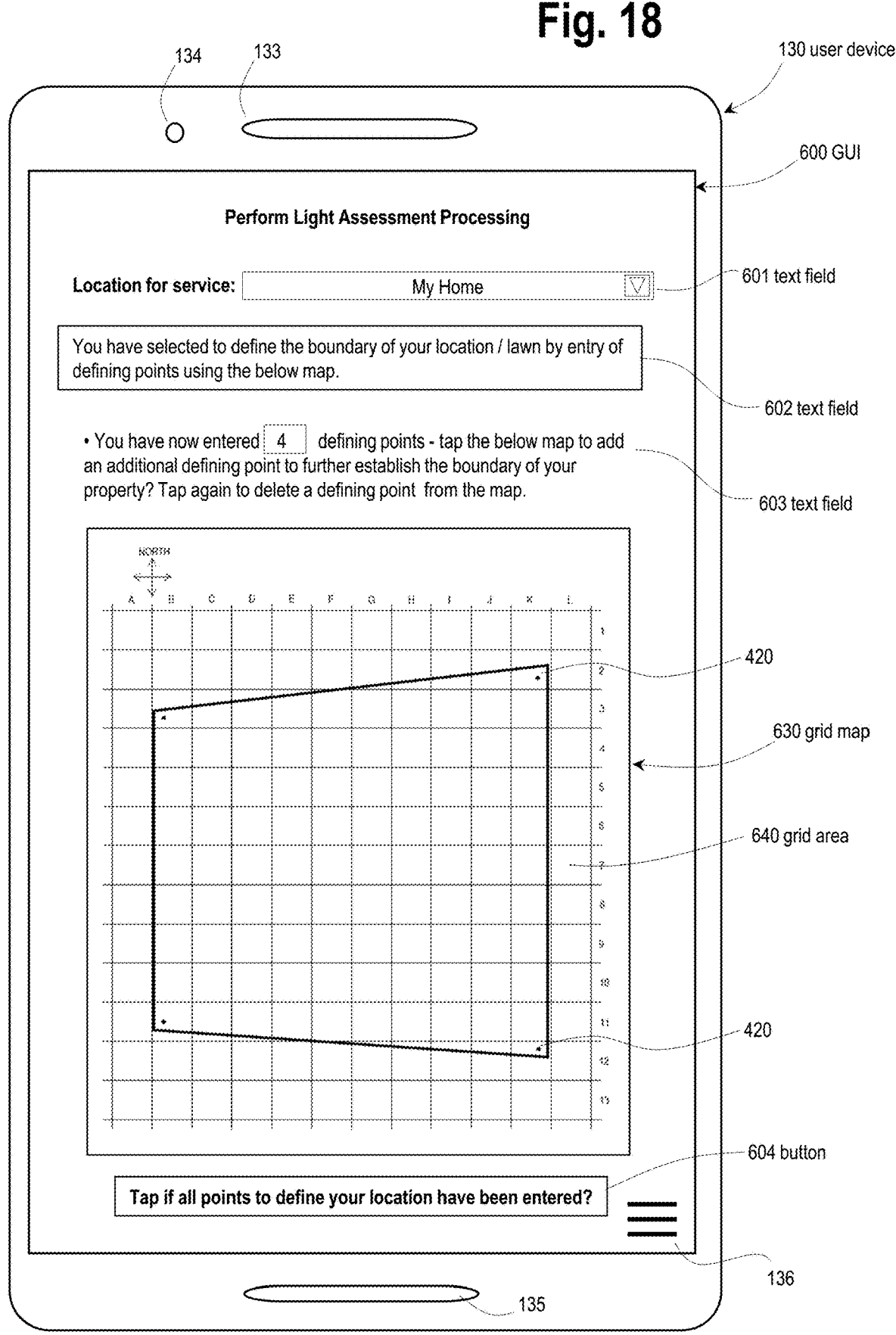
FIG. 18 is a schematic diagram of a user device displaying a graphical user interface (GUI), in accordance with principles of the disclosed subject matter.

FIG. 8 is a flowchart showing details of "LAS interfaces with user to input boundary information by interfacing with online map" of subroutine 340. Subroutine 340 can be called from the processing of FIG. 7. The process or subroutine is initiated and passes onto step 341. In step 341, the LAS presents a map to the user. The map can be presented on a user device of the user, as shown in FIG. 18. The LAS can prompt the user to tap a defining point of the location boundary. For example, a defining point may well be a corner of the location, i.e., a corner of a lawn. Then, in step 342, the LAS records the GPS location of the first defining point of the location boundary.

With further reference to FIG. 8, after step 342, the process passes onto step 343. In step 343, the LAS queries the user whether there is a further, or next, defining point of the location boundary. In other words, step 343 determines if the user has entered or submitted all the defining points that the system should use to define the extent of the physical location. The determination of step 343 may render a yes. Such a yes determination indicates that there are more defining points (of the location) that the user wants to input. For example, the user may only have tapped on a first corner of the property—and thus has additional corners of the property to input.

Accordingly, if yes in step 343, then the process passes onto step 344. In step 344, the LAS presents the map to the user, on the user device, and prompts the user to tap a next defining point, so as to define a location boundary of the location. Then, in step 345, the LAS records the GPS location of such next finding point. Then, the process passes back to step 343. Processing then continues as described above. At a point in the processing, the user will have indeed entered all defining points so as to define the boundary of the location. Accordingly, a no will be rendered in step 343. As a result, the process passes onto step 346.

FIG. 18 is a schematic diagram of a user device 130 displaying a graphical user interface (GUI) 600, in accordance with principles of the disclosed subject matter. As shown, the GUI 600 can be provided to interface with the user to select the user's location, i.e., the location to be assessed. Accordingly, a text field 601 can display a name of the location selected by the user.

The GUI 600 can also include text field 602 the provide information to the human user. The text field 602 can convey to the user—that the user has selected to define the boundary of the selected location by entering points using a map on the user's phone, for example. Additionally, text field 603 can indicate the number of defining points that the user has already entered. The text field 603 indicates that the user has entered 4 defining points. Such defining points are shown on the grid map 630, as displayed on the GUI 600. The grid map 630 corresponds to the grid map 430 shown in FIG. 12.

Additionally, the GUI 600 includes button 604. The button 604 can be selected by the human user if he or she has selected/entered all the points that should be used to define the selected location. Button 604 of FIG. 18 can thus perform the processing of process step 343 shown in FIG. 8.

As shown in FIG. 18, the grid map 640 can be generated upon the entry of a new defining points 420. That is, in processing, the system can immediately react to a newly entered defining point 420, so as to update the grid map 630. Accordingly, the user has entered 4 defining points using the GUI 600, and as a result, the grid map 630 has been generated. In such processing, the user has already interfaced with the system to select a desired size for each grid area 640 in the grid map 630. For example, the user may have selected that he or she once the grid size to be 10'×10'.

The user device 130 can include known features, such as a speaker 133, a camera 134, a microphone 135, menu options 136, and other known features.

In step 346 of FIG. 8, the LAS performs a check of the defining points that have been input. The LAS performs a check to confirm that a two dimensional location with some area has been defined. For example, if the user has only input two defining points, then the check of step 346 would fail. Other mechanisms can be utilized to assess whether the user has successfully entered sufficient information to define the location. It may be determined in step 347, that the check is not satisfied. As a result, the process passes onto step 348. In step 348, the LAS outputs a communication to the user that a further defining point is required to define the location boundary. Processing can then return to step 344 so as to receive the input of additional defining points.

Alternatively, a yes may be rendered in step 347. That is, the LAS has determined that the user has indeed entered a sufficient number of defining points so as to successfully define the boundary of the location. As result, the process passes onto step 349. In step 349, the process returns to FIG. 7, and specifically passes onto step 337 of FIG. 7.

Accordingly, as a result of the processing of FIG. 8, the boundary of a location has been input by the system. Once the boundary of the location has been input, then additional processing can be performed to segregate the location into a collection of grid areas. These areas can then be used in light assessment processing of the disclosure.

As described above, the processing of FIG. 8 inputs the boundary of a location by input of defining points via a user interface. However, defining points of a location may also be input by physically positioning the LAS 140 at the defining points of the location.

Figure 9:
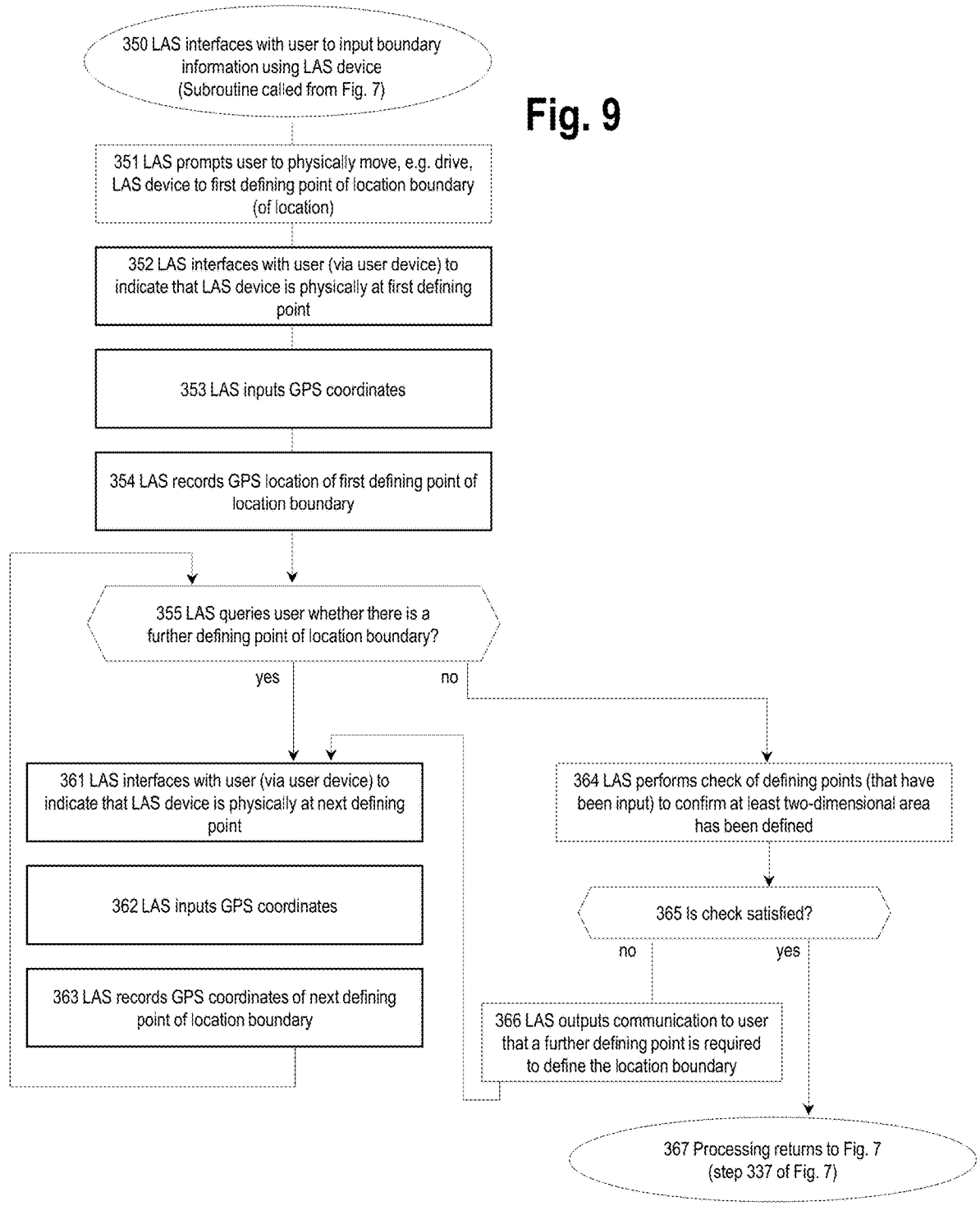
FIG. 9 is a flowchart showing further details of "LAS interfaces with user to input boundary information using LAS device" of subroutine 350, in accordance with principles of the disclosed subject matter.

FIG. 9 is a flowchart showing further details of "LAS interfaces with user to input boundary information using LAS device" of subroutine 350. Subroutine 350 can be called from the processing of FIG. 7. The subroutine is initiated and passes onto step 351.

In step 351, the LAS 140 prompts the user to physically move, for example drive or push, the LAS to a first defining point of the location boundary. For example, the LAS 140 can be mounted on a lawnmower. In step 351, the LAS can prompt the user to push the lawnmower to a corner of the lawn, i.e., to a corner of the location. Then, the LAS interfaces with the user (via the user device) to indicate that the LAS 140 is physically at a first defining point. That is, the user interfaces with the LAS 140 so as to alert the LAS 140 that the LAS 140 is at a first defining point. Then, in step 353, the LAS 140 inputs the GPS location. Then, the LAS 140 records or saves the GPS location of such first defining point of the location boundary. Then, the process passes onto step 355.

In step 355, the LAS 140 queries the user whether there is a further defining point of the location boundary. In the situation that the process is flowing from step 354, and there has only been a first defining point input, then a yes would be rendered in the processing of step 355.

Upon a yes being rendered in step 355, the process passes onto step 361. In step 361, the LAS 140 interfaces with the user (via the user device) to indicate that the LAS 140 is physically at the next defining point. For example, the human user may have pushed the lawnmower with LAS 140 to the next corner of the lawn. As result, in step 362, the LAS inputs GPS coordinates from the GPS sensor 146. Then, in step 363, the LAS 140 records or saves the GPS coordinates, i.e., the GPS location, of the next defining point of the location boundary.

After step 363, the process passes back to step 355. In step 355, the LAS 140 again queries the user whether there is a further defining point of the location boundary. At a point in the processing, all the needed boundary points will be input by the LAS 140. As a result, a no will be rendered in step 355. Processing then passes onto step 364. In step 364, the LAS 140 performs a check of the defining points that have been input. The LAS 140 confirms that at least a two dimensional area has been defined. Then, the process passes onto step 365. If the check of step 364 is not satisfied, then a no will be rendered in step 365. As result, the process passes onto step 366. Step 66, the LAS 140 outputs a communication to the user that a further defining point is required to define location boundary. Processing then passes back 361 and proceeds as described above. On the other hand, a check may be satisfied in step 365. Accordingly, a yes will be rendered in step 365. Processing then passes onto step 367. In step 367, the process returns to FIG. 7, and specifically to step 337 of FIG. 7.

It is appreciated that other approaches or methodologies can be utilized so as to input a location boundary of a location. For example, the LAS 140 could be activated to a location boundary mode. In such a mode, the user might mow his or her lawn in the normal fashion. As the user moves about their lawn, the LAS 140 could input GPS location in an ongoing manner. For example, the LAS 140 might input GPS location every second or over some other periodicity. In this manner, the LAS 140 could input a collection of GPS locations that effectively serve to define an area or extent of the lawn. From this information, boundary of the lawn, i.e., the boundary of the location could be determined.

As described below, light assessment processing of the disclosure can assess light conditions of areas of a lawn. In other words, a location, e.g., a lawn can be segregated into areas such that those areas can be assessed or analyzed individually. It may well be, and likely is, the case that different areas of a lawn experience different light exposure. Relatedly, in accordance with the disclosure, once the boundary or location boundary of a location is determined, then the location can be segregated or demarcated into a plurality of areas, i.e., into gris areas as described below. The processing of FIG. 10 provides such demarcation or segregation of a location.

Figure 10:
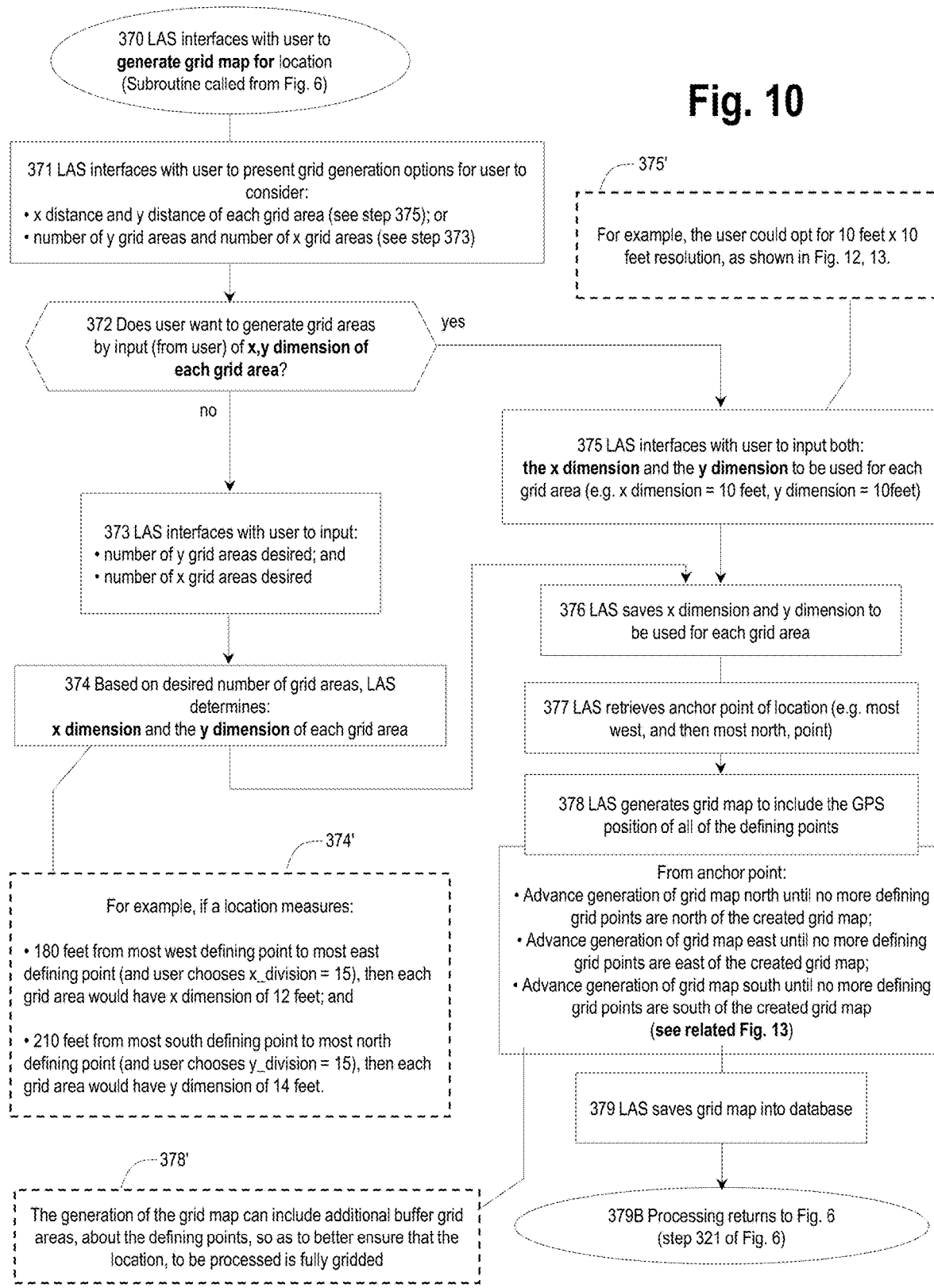
FIG. 10 is a flowchart showing details of "LAS interfaces with user to generate grid map for location" of subroutine 370, in accordance with principles of the disclosed subject matter.

Accordingly, FIG. 10 is a flowchart showing details of "LAS interfaces with user to generate grid map for location" of subroutine 370. Subroutine 370 can be called from the processing of FIG. 6. The subroutine is initiated and passes onto step 371.

In step 371, the LAS 140 interfaces with the user to present grid generation options for the user to consider. One option is for the user to provide an X distance and a Y distance of each area of the grid, i.e., for each "grid area". Another option is for the user to provide the number of desired y grid areas and the number of desired X grid areas. For example, the user might want to divide her lawn into 10 demarcations in the north-south direction (y direction) and into 5 demarcations in the east-west direction (x direction). Accordingly, the options are presented to the user in step 371.

Figure 12:
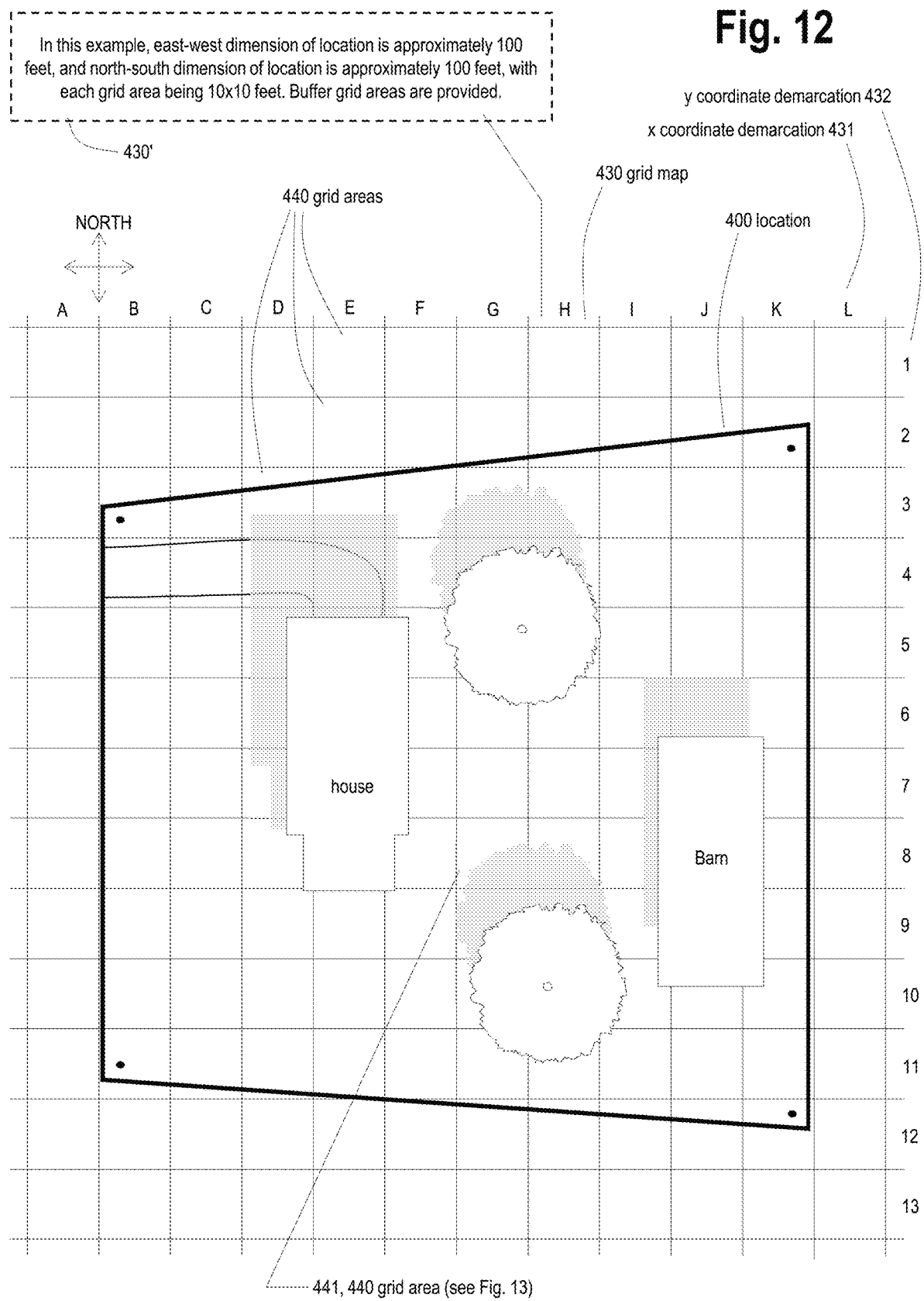
FIG. 12 is a schematic diagram showing a grid map overlaid over location 400, in accordance with principles of the disclosed subject matter.
Figure 13:
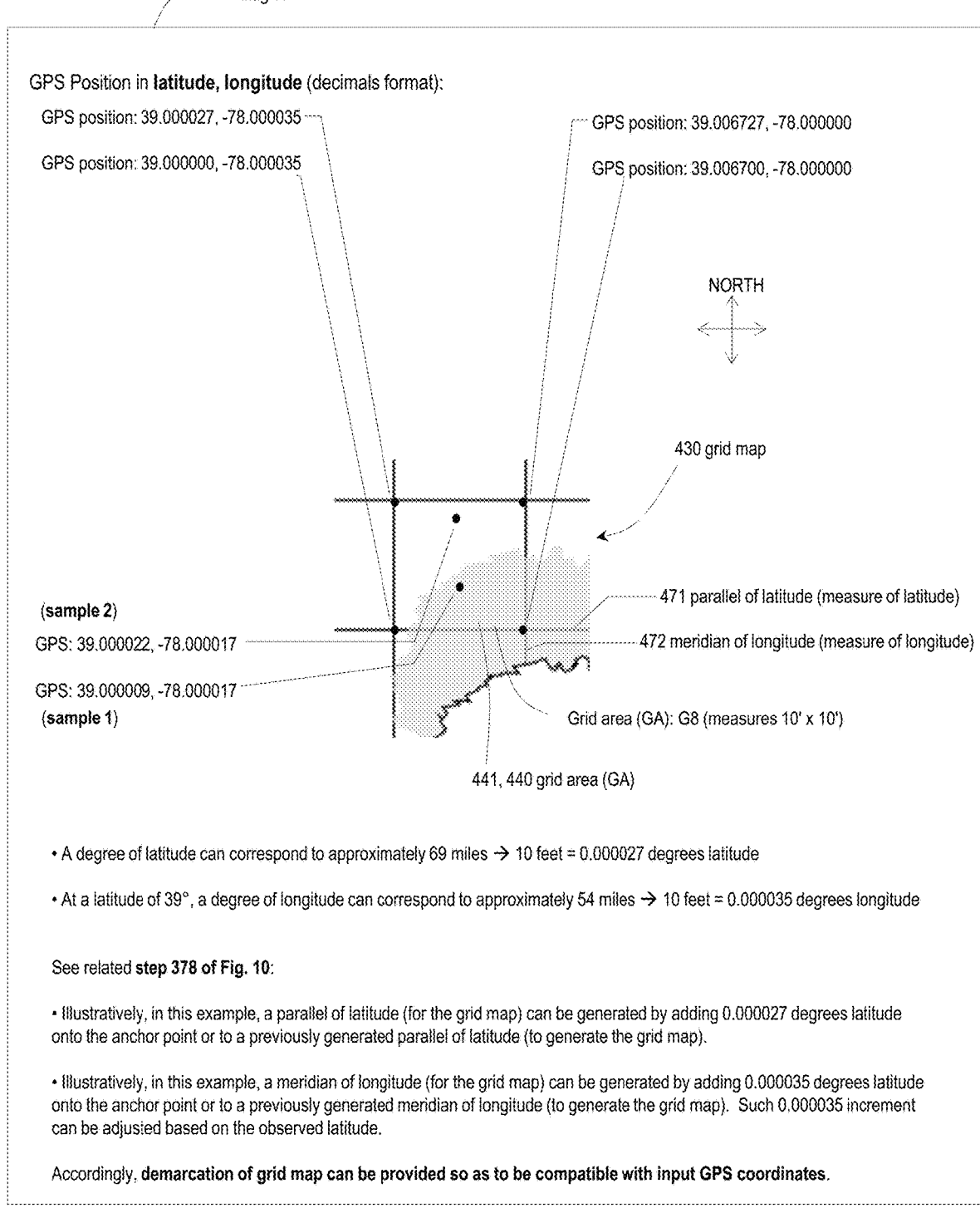
FIG. 13 is a schematic diagram showing features of a grid map, in accordance with principles of the disclosed subject matter.

Relatedly, in step 372, the LAS 140 determines if the user wants to generate the grid by input of X, Y dimension of each grid area. If yes, then the processing passes onto step 375. In step 375, the LAS 140 interfaces with user to input both the X dimension and the Y dimension to be used for each grid area. For example, the user might opt to set the X dimension at 10 feet and to set the Y dimension at 10 feet, as noted at 375' in FIG. 10. Such resolution of a location is illustrated in FIG. 12 and FIG. 13. Then, the process passes to step 376. In step 376, the LAS 140 saves the X dimension and the Y dimension to be used for each grid area.

Alternatively, a no may be rendered in step 372. That is, the system determines that the user does not want to generate the grid based on X and Y dimensions of each grid area. Instead, a no determination in step 372 indicates that the user wants to generate the grid areas based on a number of grid areas desired. Accordingly, the process passes onto step 373. In step 373, the LAS 140 interfaces with the user to input both the number of Y grid areas desired, and the number of X grid areas desired. Then, the process passes onto step 374.

In step 374, the LAS 140 uses the number of grid areas desired to generate the X dimension and the Y dimension of each grid area. For example, as noted at 374' of FIG. 10, if a location measures:

180 feet from most west defining point to most east defining point (and user chooses x_division=15), then each grid area would have X-dimension of 12 feet; and
210 feet from most south defining point to most north defining point (and user chooses y_division=15), then each grid area would have y-dimension of 14 feet.

After step 374, the process passes onto step 376. In step 376, the LAS 140 saves the X dimension and the Y dimension to be used for each grid area. That is, the processing of either step 375 or step 374 results in rendering an X dimension and Y dimension to be used for each grid area. It is appreciated that other methodologies may be used to demarcate or segregate a location. Also, it is not necessary that a location be segregated into grid areas having the same dimensions. That is, for example, in one embodiment some grid areas may have larger grid areas than others.

With further reference to FIG. 10, after step 376, the process passes onto step 377. In step 377, in this embodiment of the disclosure, the LAS 140 retrieves or generates an "anchor point" of the location. For example, using a predetermined convention, the anchor point might simply be the most west, and then most north, point on the location, i.e., on the property. In other words, an anchor point can be defined—"off which" a grid arrangement can be based. After step 377, the process passes onto step 378.

In step 378, the LAS 140 generates a grid map. The grid map can be generated to include the GPS position of all the defining points. In accordance with an embodiment of the disclosure, FIG. 13 illustrates aspects of grid generation. As shown in FIG. 10, generation of a grid map can include advancing from a west most anchor point in a north, east, and south direction. That is, as reflected in step 378, a grid map can be generated by advancing in different directions from an anchor point. That is, processing can be performed to (1) advance generation of grid map north until no more defining grid points are north of the created grid map; (2) advance generation of grid map east until no more defining grid points are east of the created grid map; and (3) advance generation of grid map south until no more defining grid points are south of the created grid map. Such a grid map can be generated as shown in FIG. 12. Relatedly, as described further below, the anchor of the location 400 (shown in FIG. 11) may be the first defining point 421, as shown in the upper left corner of the location 400.

As reflected at 378' in FIG. 10, the generation of a grid map can include additional buffer grid areas, about the defining points, so as to better ensure that the location is fully gridded. That is, extra grid areas can be provided on the various sides of the location so as to ensure that a grid area, generated by the processing, indeed encompasses the physical extent of the location.

After step 370, the process passes onto step 379. In step 379, the LAS 140 saves the grid map into a suitable database. For example, the grid map can be saved into the location database 163 of the LAS 140. Then, in step 379B, the processing returns to FIG. 6, and specifically passes onto step 321 of FIG. 6. Processing then continues as described above.

Figure 11:
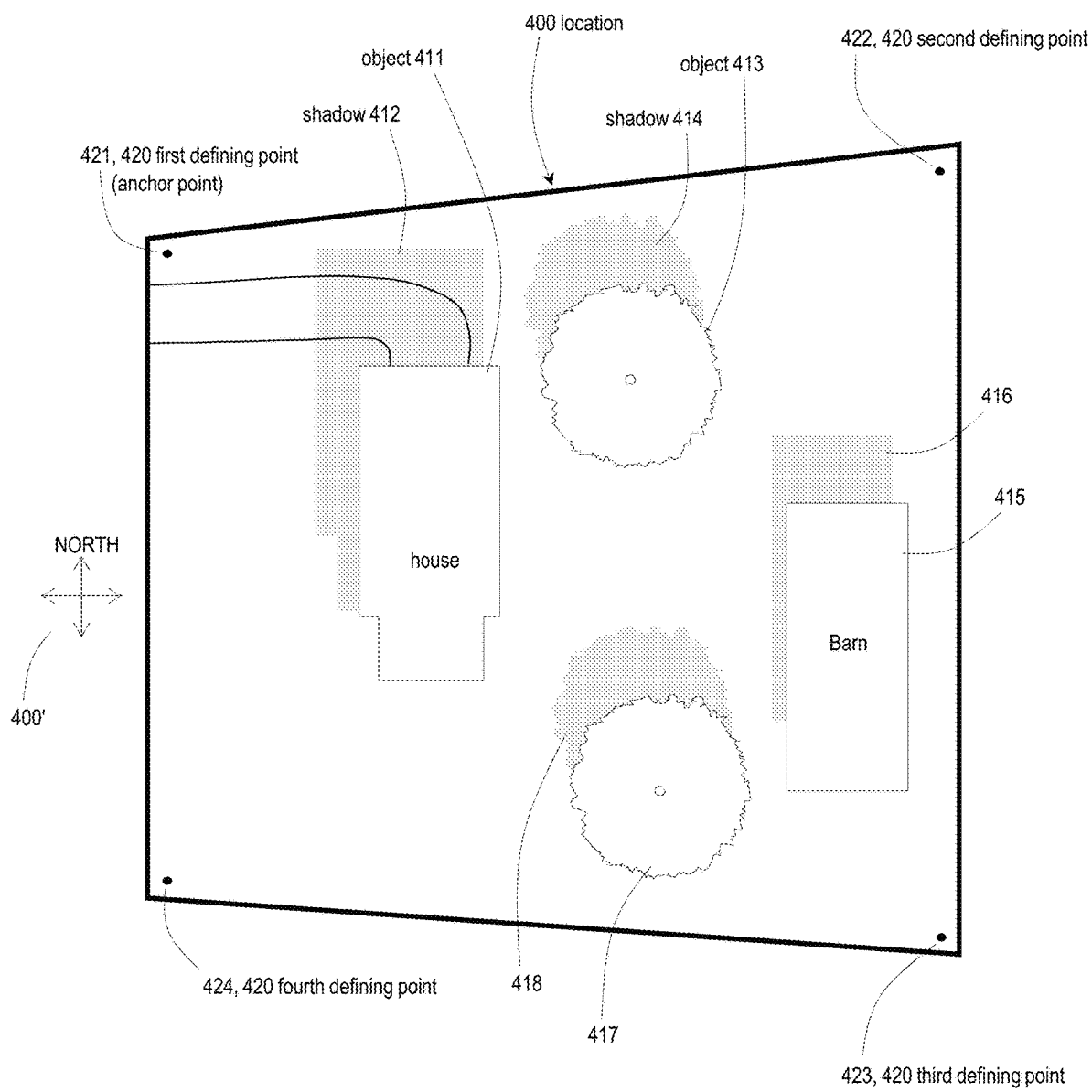
FIG. 11 is a schematic diagram of a location 400, in accordance with principles of the disclosed subject matter.

With the conclusion of the processing of FIG. 10, a location has been defined by defining points, and a grid map has been generated to demarcate such location into gridded areas. Relatedly, FIG. 11 is a schematic diagram of a location 400, in accordance with principles of the disclosed subject matter. Additionally, FIG. 12 is a schematic diagram of a grid map 430 that is overlaid over the location 400.

As shown in FIG. 11, the location 400 can be described as a property or a lawn, for example. The location 400 includes a house or object 411 and a barn or object 415. For purposes of illustration, the house and the barn cast a shadow 412 and 416, respectively. The location 400 also includes additional objects 413 and 417. Such objects are illustratively depicted as trees. The object 417 casts a shadow 418. The object 413 casts a shadow 414.

The location 400 can also include defining points 420 at the corners of the location 400. The defining point 420 can be entered utilizing the processing of step 333 of FIG. 7 or step 335 of FIG. 7. The defining point 420 can include a first defining point 421, a second defining point 422, a third defining point 423, and a fourth defining point 424. As shown by directional 400', the location of property 400 is oriented such that the first defining point 421 is located in the northwest corner of the location 400. Accordingly, using the convention of step 377 (FIG. 10) the first defining point 421 shown in FIG. 11 can be the anchor point of the location 400.

FIG. 12 is a schematic diagram showing grid map 430 overlaid over location 400. As described above, the grid map 430 demarcates the location 400 into grid areas 440. Such demarcation allows each of the grid areas to be processed and assessed individually. In other words, generation of the grid map 430 allows different parts of the location or property 400 to be processed separately.

In the example of FIG. 12, as noted at 430', east-west dimension of the location 400 is approximately 100 feet, and north-south dimension of the location 400 is approximately 100 feet, with each grid area being 10×10 feet. As shown in FIG. 12, buffer grid areas are provided. That is, grid areas 440 can be provided about the location 400 so as to provide buffer grid areas. For example, a location or property might include shapes or geometries that are irregular. Such irregularity can result in a portion of the location of property being outside the boundary as determined by the processing described above. The buffer grid areas ensure that all areas of a location indeed fall within the grid map that has been generated.

To further mitigate the possibility that a GPS location is input, in operation of the LAS 140, that is not within the grid map 430, processing can be performed to mitigate such outlier. For example, input associated with the GPS location outside the grid map 430 might just be allocated to the closest grid area.

As shown in FIG. 12, the grid map 430 can be demarcated in alpha numerical identifiers. In the example of FIG. 12, Y coordinate demarcation 432 can be provided using numerical identifiers 1-13. In the example of FIG. 12, X coordinate demarcation 431 can be provided using alpha identifiers A-L. For purposes of illustration, the grid map 430 can include a grid area 441. The grid area 441 can also be described as grid area G-8, using the coordinate system set forth in FIG. 12.

Relatedly, FIG. 13 is a schematic diagram 470, in accordance with principles of the disclosed subject matter. FIG. 13 illustrates a grid area (GA) 441 and illustrative processing relating to such grid area.

To explain, a location or property can be segregated into grid areas 440 using different methodologies. As described above, a user may desire to specify how big each grid area should be. Alternatively, a user might specify how many grid areas that the user wants in a particular direction. For a large area with few objects, it may be preferred to use a grid map with fewer number of grid areas. However, a location could include many objects and many nuances to the landscape of the location. As a result, it may be desired to use a grid map with a large number of grid areas. In using a large number of grid areas, better "resolution" of assessment of different areas of the location can be provided. Alternatively, the size of a grid area and/or the number of grid areas provided to a location may be dictated by the LAS 140 itself. For example, in some embodiments, a user may not be provided the option to choose a size of a grid area.

For purposes of customer experience, in the case that the user can choose size of grid area, it should be appreciated that choice of "size" of grid area or choice of "number" of grids area are options that a human user can understand and related to. For example, a user might choose that the size of a grid area is 10'×10'. For example, the user might choose that a property be demarcated into 10 grid areas in the north-south direction and 20 grid areas in the east-west direction. Based on the demarcation input by the user, the LAS 140 (and more specifically the DPP 150) can generate the grid map 430, as shown in FIG. 12. Such grid map 430, overlaid over a map of the location 400, can be presented on a user interface 130, for display to a human user.

Accordingly, a grid map 430 can be generated based on input from a user, in a manner that is understandable to the user. However, location data input (from the LAS 140) may well be in the form of GPS data. Accordingly, in the processing of the disclosure, it may well be needed to translate or represent the grid map 430 in terms of GPS position of each grid area in the grid map 430.

Relatedly, the LAS 140, and specifically the DPP 150, can generate a grid map 440 based in parallels of latitude and meridians of longitude. Such generation of a grid map can be performed based on anchor point 421 as shown in FIG. 11. That is, the LAS 140 can know the GPS position of the anchor point 421 from the processing as described above. Also, the LAS 140 can determine the increment in latitude that corresponds to a single grid area. Accordingly, the LAS 140 can sequentially add such increment onto the GPS position of the anchor point moving in a south direction until no further defining points 420 are south of the most southern grid area. In similar manner, the LAS 140 can sequentially add such increment onto the GPS position of the anchor point moving in a north direction, until no further defining points 420 are north of the most northern grid area. Such progression in the south and in the north direction, from the anchor point 421 would be necessary in the example of FIG. 11, i.e., because the defining point 423 is south of the anchor point 421; and the defining point 422 is north of the anchor point 421. Accordingly, the grid map 440 can be represented in terms of parallels of latitude in the north-south direction.

It should be appreciated that similar processing and methodology could be applied in the longitudinal direction, i.e., such that the grid map 440 can be represented in terms of meridians of longitude. However, such processing, as to longitude, is somewhat more complex in that distance between meridians of longitude depend on the latitude.

Figure 14:
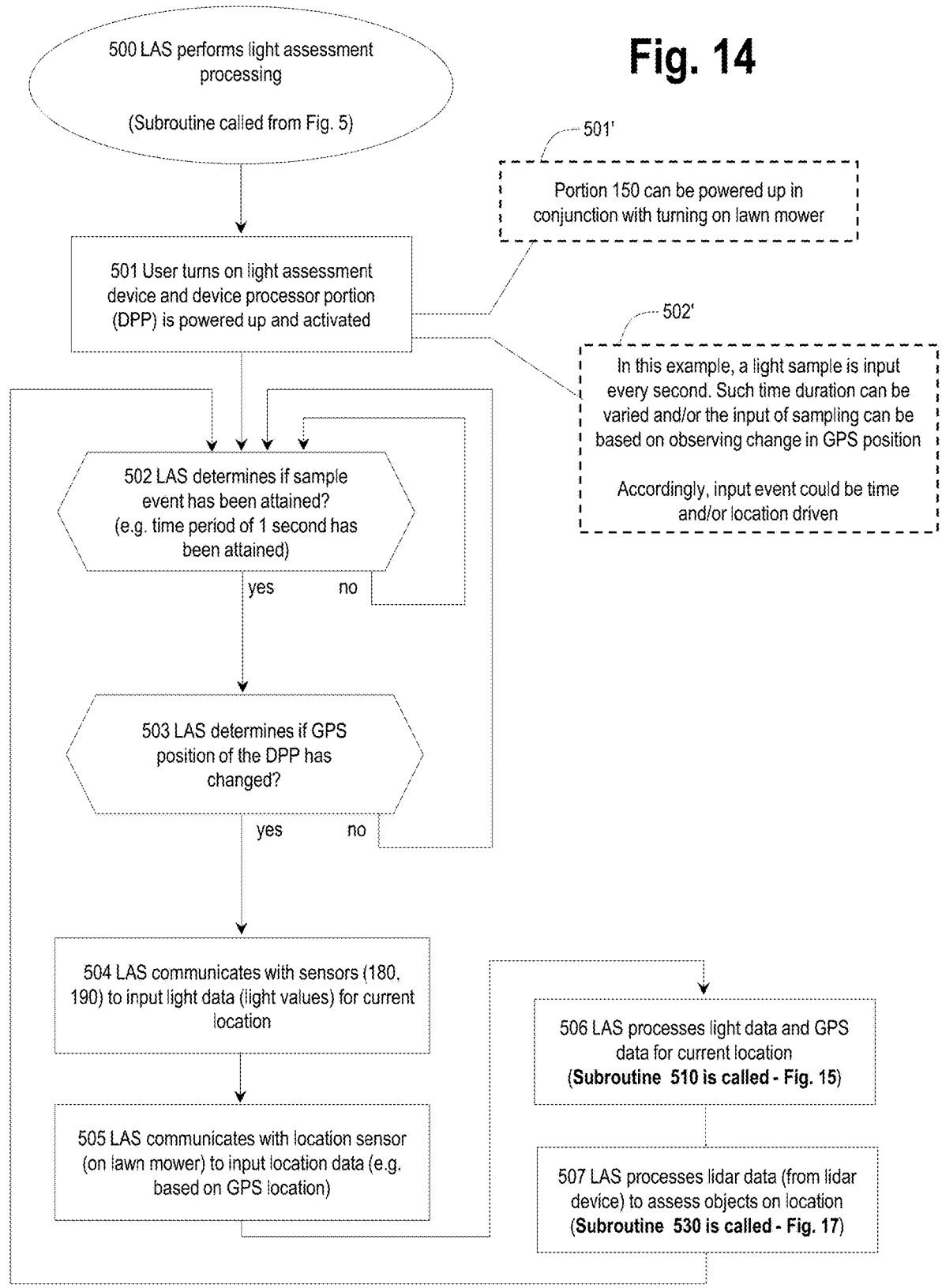
FIG. 14 is a flowchart showing details of "LAS performs light assessment processing" of subroutine 500, in accordance with principles of the disclosed subject matter.

Accordingly, it may be the case that the grid map 430 is represented on the user interface showing indicia of feet or other linear distance. However, processing performed by the LAS 140, as illustrated in FIG. 14 and described below, is based on parallels of latitude and meridians of longitude. That is, a grid map arrangement can be provided into which a GPS location of the LAS 140 can be mapped.

In performing the above processing and methodology, the LAS 140 can determine the increment in latitude that corresponds to the desired Y dimension of a grid area. Also, the LAS 140 can determine the increment in longitude that corresponds to the desired X dimension of a grid area. Relatedly, as illustrated in FIG. 13, a degree of latitude can correspond to approximately 69 miles. This corresponds to 10 feet=0.000027 degrees latitude. Parallels of latitude are of a consistent distance as one moves away from the equator. That is, "parallels of latitude" are parallel and thus maintain a consistent distance from each other.

Also, for example and illustratively, at a latitude of 39°, a degree of longitude can correspond to approximately 54 miles. This corresponds to 10 feet=0.000035 degrees longitude. At a different latitude, it is appreciated that 10 feet in the X direction would correspond to a different value in degrees of longitude. Accordingly, in a known manner, the LAS 140 can determine, based on particular latitude, variance in longitude over the distance of a segmented area in the east-west (X dimension). Accordingly, at a location near the equator of the earth, the change in longitude over the distance of 10 feet will be small, as compared to the change in longitude over the distance of 10 feet at a location close to the north pole.

Accordingly, in this example, a parallel of latitude (for the grid map) can be generated by adding 0.000027 degrees latitude onto the anchor point or to a previously generated parallel of latitude (to generate the grid map).

Accordingly, in this example, a meridian of longitude (for the grid map) can be generated by adding 0.000035 degrees latitude onto the anchor point or to a previously generated meridian of longitude (to generate the grid map).

As a result, the methodology described above can be used to generate a grid map based on increments of latitude and longitude (incremented off an anchor point). Accordingly, a grid map generated in such manner can correspond to a grid map based on linear distance, as is generated in the processing of step 378 described above.

Accordingly, demarcation of a grid map (based on latitude and longitude) can be provided so as to be compatible with (and conducive to) input of GPS coordinates in operation of the LAS 140. Relatedly, such grid map based in latitude and longitude provides for the processing of FIG. 14 and subroutine 500, described below.

Relatedly, FIG. 13 shows the GPS coordinates of the 4 corners of the grid area 441 shown in FIG. 12. The GPS position is expressed in decimal format for purposes of illustration. However, it is of course appreciated that other expressions of GPS position and other expressions of latitude/longitude position could be used in the processing of the disclosure. As further described below, samples of light can be input by the LAS 140 as the LAS 140 is driven or moved about the location. FIG. 13 illustrates sample 1 and sample 2. For example, the GPS coordinates of sample 1 are: 39.000009, −78.000017. The coordinates of such sample are bounded by the coordinates of the grid area 441. That is, the LAS 140 can determine that the coordinates of sample 1 are bounded by the coordinates of the four corners of grid area 441. As a result, sample 1 is allocated or associated with the grid area 441. Over time, additional samples can be associated with the grid area 441. Specifically, as illustrated, sample 2 can be associated with the grid area 441. Each sample can include GPS data and light level data. Over time, each grid area and a location can accumulate more and more samples, i.e., over time more samples can be associated with a particular grid area. As a result, light attributes of each grid area in the location 400 can be assessed. Variance can be observed over the course of the day, month, or year, or any other time period. Illustratively, such light samples might be input in the course of a homeowner mowing his or her lawn every week. Related processing is described with reference to FIG. 14 below.

FIG. 14 is a flowchart showing details of "LAS 140 performs light assessment processing" of subroutine 500. Subroutine 500 can be called from the processing of FIG. 5 described above. The processing of subroutine 500 is initiated and passes onto step 501. In step 501, the user turns on the light assessment device, i.e., the user turns on the LAS 140. As a result, the DPP 150 is powered up and activated. As noted at 501', the processor 150 can be powered up in connection with turning on the lawnmower, upon which the LAS 140 is mounted. As noted at 502', in this example, a light sample is input every second. Such time duration can be varied. For example, a light sample could be input every tenth of a second, every quarter second, every half second, every 2 seconds, every 3 seconds, every 4 seconds, every 5 seconds, or over some other duration, as may be desired.

Alternatively, sampling can be based on observing change in GPS position. That is, if the DPP 150 observes the LAS 140 moving a certain degree of latitude and/or a certain degree of longitude, then such movement can trigger a further sampling to be performed. Such sampling can include a further input of light level and GPS position at which such sample was taken, as well as the time of the sampling. Accordingly, an input event (to trigger an additional sample to be taken) can be time driven and/or location driven. For example, in an embodiment, a sample might be taken over some time period (for example every second), but only if some predetermined movement is observed by the DPP 150. Such processing can address the situation in which the lawnmower or other machine is parked at a single location over a period of time.

With further reference to FIG. 14, after step 501, the process passes onto step 502. In step 502, the LAS 140 determines if the sampling event has been attained. That is, as described at 502', has an event occurred so as to trigger an additional sample to be taken. For example, has a time period of 1 second been attained. If no, then the processing can include a loop as shown in FIG. 14 until a sample event has indeed been attained. On the other hand, a yes may be rendered in the processing of step 502.

If a yes is rendered in step 502, then the processing passes onto step 503. In step 503, the LAS 140 determines if the GPS position of the DPP 150 has changed. That is, as described above, such processing provides a check that the LAS 140 is indeed physically moving. If movement is not observed, then, in accordance with at least one embodiment of the disclosure, no further sample will be taken.

Accordingly, if a no is rendered in step 503, then the process loops back to step 502. On the other hand, if a yes is rendered in step 503, then the process advances to step 504. In step 504, the DPP 150 communicates with sensors 180, 190 to input related data. Accordingly, light values are input for the current location. The top light sensor 170 can input a light value that is indicative of direct sunlight. The side light sensor 180 can input a light value that is indicative of reflected light. As described above, the LAS 140 can include any number of light sensors as may be desired. After step 504, the process passes onto step 505.

In step 505, the DPP communicates with location sensor or GPS sensor 146 so as to input location data. Such location data can be based on and/or utilize GPS location. Then, the process passes onto step 506. In step 506, the LAS 140 (and more specifically the DPP 150) processes light data and GPS data for the current location. The processing of step 506 can be performed by subroutine 510, as described below with reference to FIG. 15. After step 506, the process passes onto step 507.

In step 507, the LAS 140 processes lidar data from the lidar sensor 190. Such processing can be performed to assess position of objects on the location. To perform the processing of step 507, subroutine 530 can be called or invoked. Details of subroutine 530 are described below with reference to FIG. 17. After step 507, the process returns to step 502. Accordingly, the system waits for a further sample event to be attained.

With further reference to FIG. 14 in step 503, in some embodiments, the processing performed by the DPP 150 may simply not take into account whether the LAS 140 has or has not physically moved. That is, it may be desired and deemed useful to input light samples in an ongoing, periodic basis regardless of whether the LAS 140 is experiencing movement. In other words, even if the LAS 140 is in a static position, light samples taken over the course of time could yield relevant and useful data.

Figure 15:
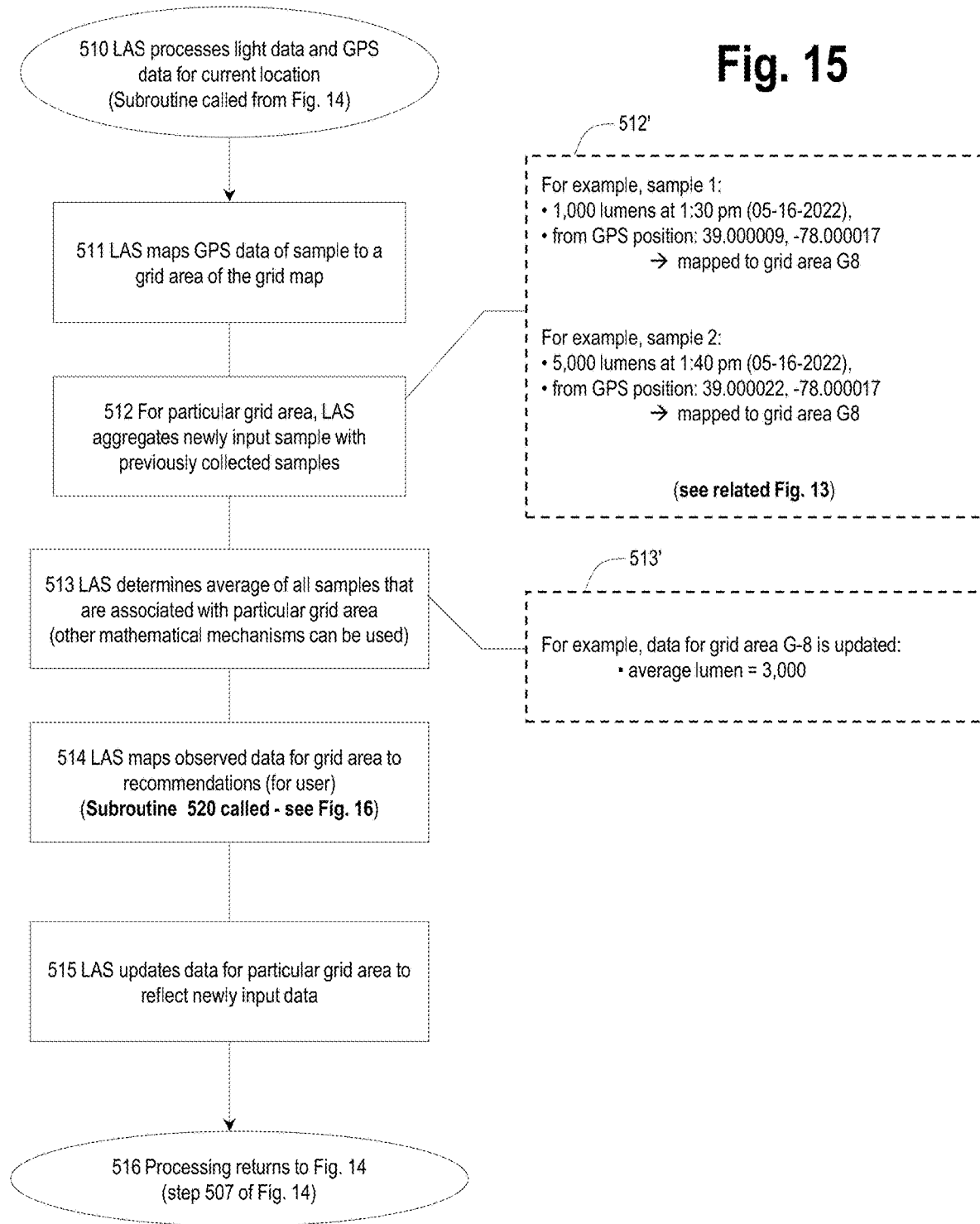
FIG. 15 is a flowchart showing in further detail the "LAS processes light data and GPS data for a current location" of subroutine 510, in accordance with principles of the disclosed subject matter.

FIG. 15 is a flowchart showing in further detail the "LAS 140 processes light data and GPS data for a current location" of subroutine 510. Such subroutine can be called or invoked from the processing of FIG. 14. As shown, processing is initiated and passes onto step 511. In step 511, the LAS 140 maps the GPS data of the sample to a grid area 440 of the grid map 430. Such is illustrated by the mapping of sample 1, shown in FIG. 13, onto grid area 441. That is, the DPP 150, of the LAS 140, can process the GPS location of an input sample to determine which grid area bounds or surrounds such GPS location of the input sample. Accordingly, the sample is associated with (i.e., mapped to) the grid area 440 that bounds or surrounds the GPS location of the sample. Then, the process passes onto step 512.

In step 512, for the particular grid area to which the sample is associated, the LAS 140 aggregates newly input sample with previously collected samples. As noted at 512' of FIG. 15, the sample 1 and sample 2 shown in FIG. 13 can be aggregated together. Then, the process passes onto step 513. In step 513, the LAS 140 determines desired metrics or parameters associated with the input samples. In the illustrative processing of step 513, the LAS 140 determines the average light value of all samples that are associated with the particular grid area. However, it is appreciated that any desired metric, parameter, or other mathematical mechanism could be used to gain useful information from the input data. Relatedly, it is appreciated that various attributes of samples can be input and associated with each sample. For example, the data associated with sample 1 and sample 2 can include the particular time of day that the sample was taken, as reflected at 512' in FIG. 15.

Once the processing of step 513 is performed, associated databases and/or data records can be updated to reflect the newly input data. As noted at 513' in FIG. 15, for example, data for grid area G-8 can be updated in location database 163. In the example of FIG. 15, the average lumen value of sample 1 and sample 2 can be calculated to be 3,000. Such a value can then be used to assess conditions of the particular area of lawn and to make recommendations in regard to the particular area of lawn. For example, an area of lawn that is routinely shaded may warrant different grass seed, as compared to an area of lawn that is routinely in direct sunlight.

Relatedly, after step 513 of FIG. 15, the process passes onto step 514. In step 514, the LAS 140 maps observed data, for the grid area, to recommendation(s) for the user. The processing of step 514 can be performed by subroutine 520. Details of subroutine 520 are described with reference to FIG. 16 below. Then, the process passes onto step 515. In step 515, the LAS 140 updates data for the particular grid area to reflect the newly input data. Then, in step 516, the processing returns to FIG. 14, and specifically to step 507 of FIG. 14.

Figure 16:
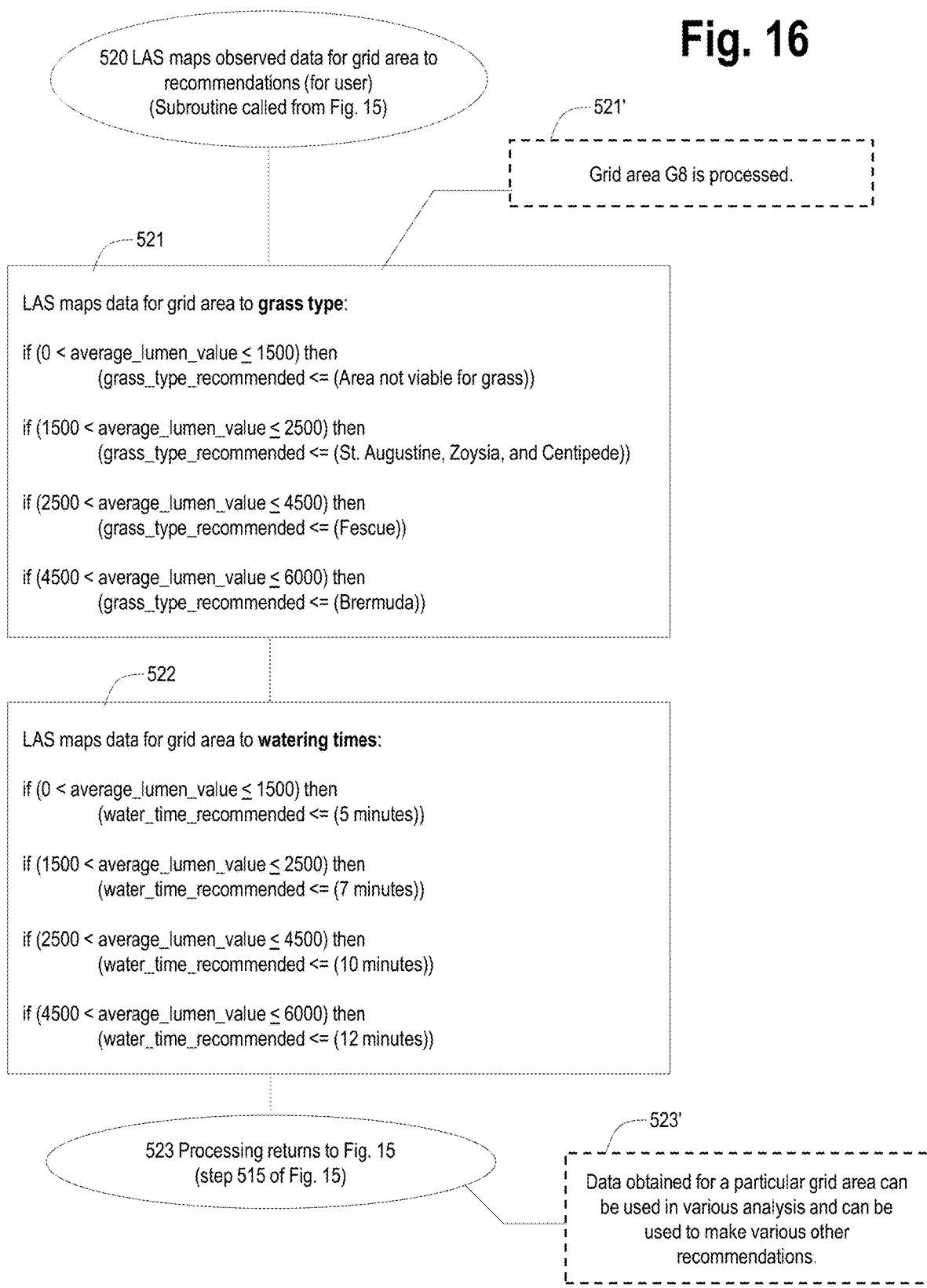
FIG. 16 is a flowchart showing in further detail the "LAS maps observed data for grid area to recommendations (for user)" of subroutine 520, in accordance with principles of the disclosed subject matter.

FIG. 16 is a flowchart showing in further detail the "LAS 140 maps observed data for grid area to recommendations (for user)" of subroutine 520. Such subroutine can be called or invoked from the processing of FIG. 15. The processing of step 520 is initiated and passes onto step 521. In step 521, the LAS 140 maps input data for a particular grid area to grass type. For example, grid area G-8 could be processed in step 521, as well as in step 522 described below.

As shown in step 521, different ranges of light value can be provided and can map into particular grass types that correspond to such ranges of light. In the example of grid area G-8, an average lumen value of 3000 was observed, as illustratively shown at 512' in FIG. 15. Accordingly, in the processing of step 521, such light value of 3000 could be mapped to a recommended grass type of "fescue."

Similarly, in subsequent step 522, the LAS 140 can map data for a grid area to watering times. That is, different ranges of light value can be provided and can map into particular watering times or generations. In the example of grid area G-8, as noted above, an average lumen value of 3000 was observed. Accordingly, in the processing of step 522, such lumen value would be mapped to a watering time of 10 minutes.

It is appreciated that observed light value data can be mapped into numerous other parameters, and the disclosure is not limited to mapping light data to only grass type and watering times. For example, light data might be mapped into recommended nutrients, so as to provide recommendations of what nutrients to apply to what areas of a homeowner's lawn. Accordingly, as reflected at 323' of FIG. 16, data obtained for a particular grid area can be used in various analysis and can be used to make various recommendations, and the processing of the disclosure is not limited to the particular recommendations shown in FIG. 16.

With further reference to FIG. 16, after step 522, the process passes onto step 523. In step 523, the processing returns to FIG. 15, and specifically step 515 of FIG. 15.

Figure 17:
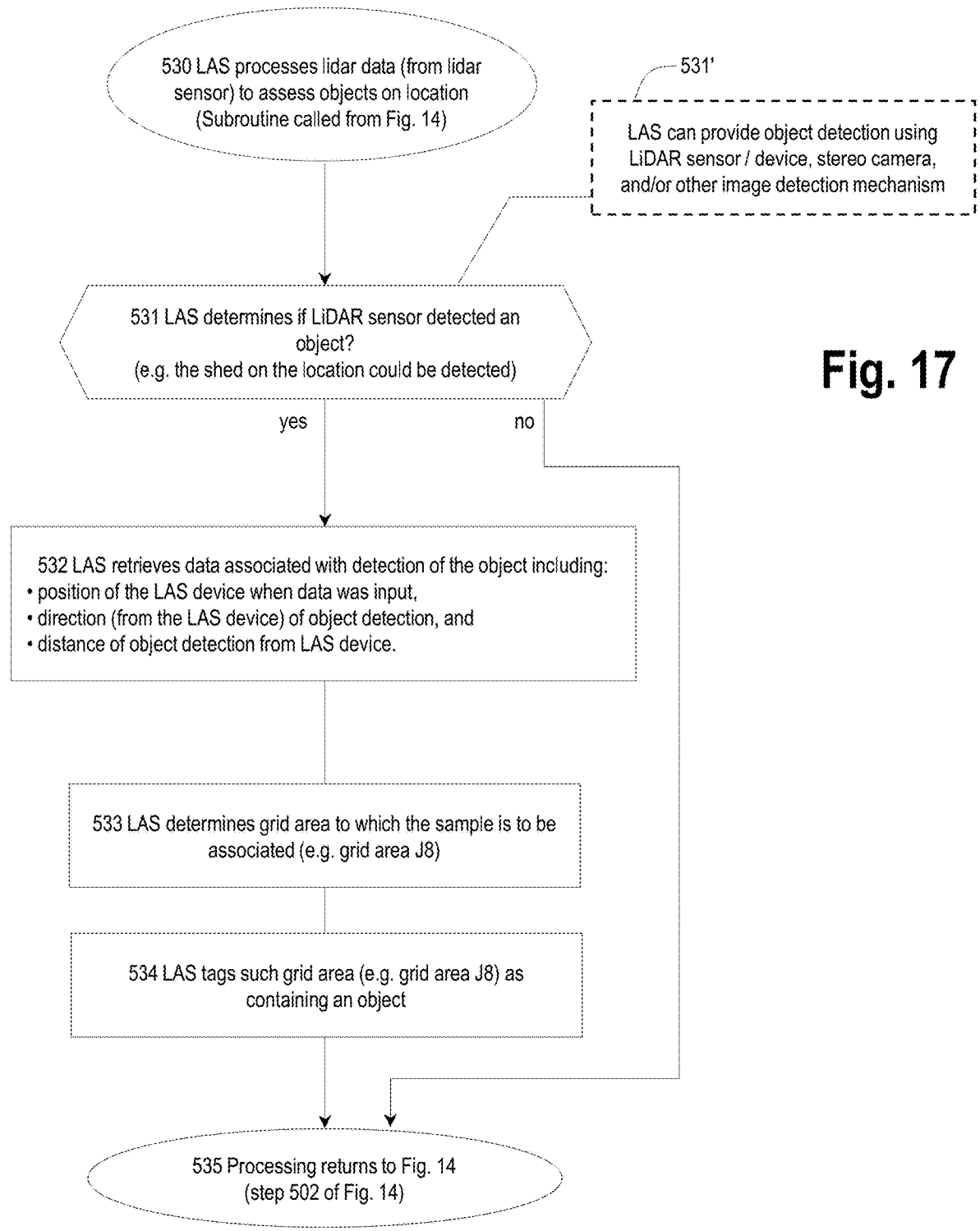
FIG. 17 is a flowchart showing in further detail "LAS processes lidar data (from lidar device) to assess objects on location" of subroutine 530, in accordance with principles of the disclosed subject matter.

FIG. 17 is a flowchart showing in further detail "LAS processes lidar data (from lidar device) to assess objects on location" of subroutine 530. Such subroutine can be called or invoked from the processing of FIG. 14. As reflected at 531' in FIG. 17, the LAS 140 can provide object detection using a lidar sensor or device. Other sensors can be utilized such as a stereo camera and/or other image detection mechanism. As shown in FIG. 4, the LAS 140 can include a lidar sensor 190, which can be located on a side of the LAS 140.

As is known in the art, lidar or LiDAR is a technology that utilizes lasers to assess ranges. A laser can be targeted on a surface and a time-of-flight can be monitored. That is, a lidar device can measure the time that it takes for reflected light to return to the receiver. Any known lidar sensor can be used with the processing of the disclosure as desired.

The processing of FIG. 17 can be initiated and passes onto step 531. In step 531, the LAS 140 determines if the lidar sensor detected an object. That is, in step 531, the LAS 140 determines if, for the particular grid area at which the LAS 140 is currently physically positioned, the lidar sensor detected an object. The lidar sensor can be activated at the same time as the light sensors on the LAS 140. Shown in FIG. 14, upon a sample event being attained, one or more lidar samples can be input in the processing of step 507 at the same time as light samples are input in the processing of step 506.

If a no is rendered in step 531, then the processing passes onto step 535. In step 535, the processing returns to FIG. 14, and specifically step 502 of FIG. 14. On the other hand, a yes may be rendered in step 531. The process then passes onto step 532. In step 532, the LAS retrieves data associated with detection of the object including: position of the LAS when data was input, direction (from the LAS device) of object detection, and distance of object detection from the LAS. To perform such processing, the LAS 140 can be provided with an internal compass to other direction sensing mechanism.

Then, in step 533, the LAS 140 determines the particular grid area to which the sample is to be associated. Illustratively, the lidar sensor 190 of the LAS 140 might be pointed in the east direction when the LAS 140 is in grid area H-8, which can be described as grid area H8. Further, the lidar sensor could determine that an observed object is 15 feet away. Based on the relative positioning, the LAS 140 can thus determine that an object is located on grid area J-8. At a later time, the LAS 140 might be positioned on grid area I-8—and the lidar sensor inputs a further input indicating that an object is located on grid area J-8. Accordingly, over time, more and more data points can be input that reflects the location of the illustrative barn on the location 400. As more and more data is collected, the specific position of the barn on the property, i.e., on the location, can be further refined.

After step 533, the process passes onto step 534. In step 534, the LAS 140 tags the particular area, e.g., grid area J-8, as containing an object. Then, the process passes onto step 535. In step 535, the processing returns to FIG. 14, and specifically passes onto step 502 of FIG. 14. As shown in FIG. 14, the processing then returns to step 502 of FIG. 14. The system then waits until a further sample event has been attained—at which time the LAS 140 will again proceed through the processing as described above.

Figure 19:
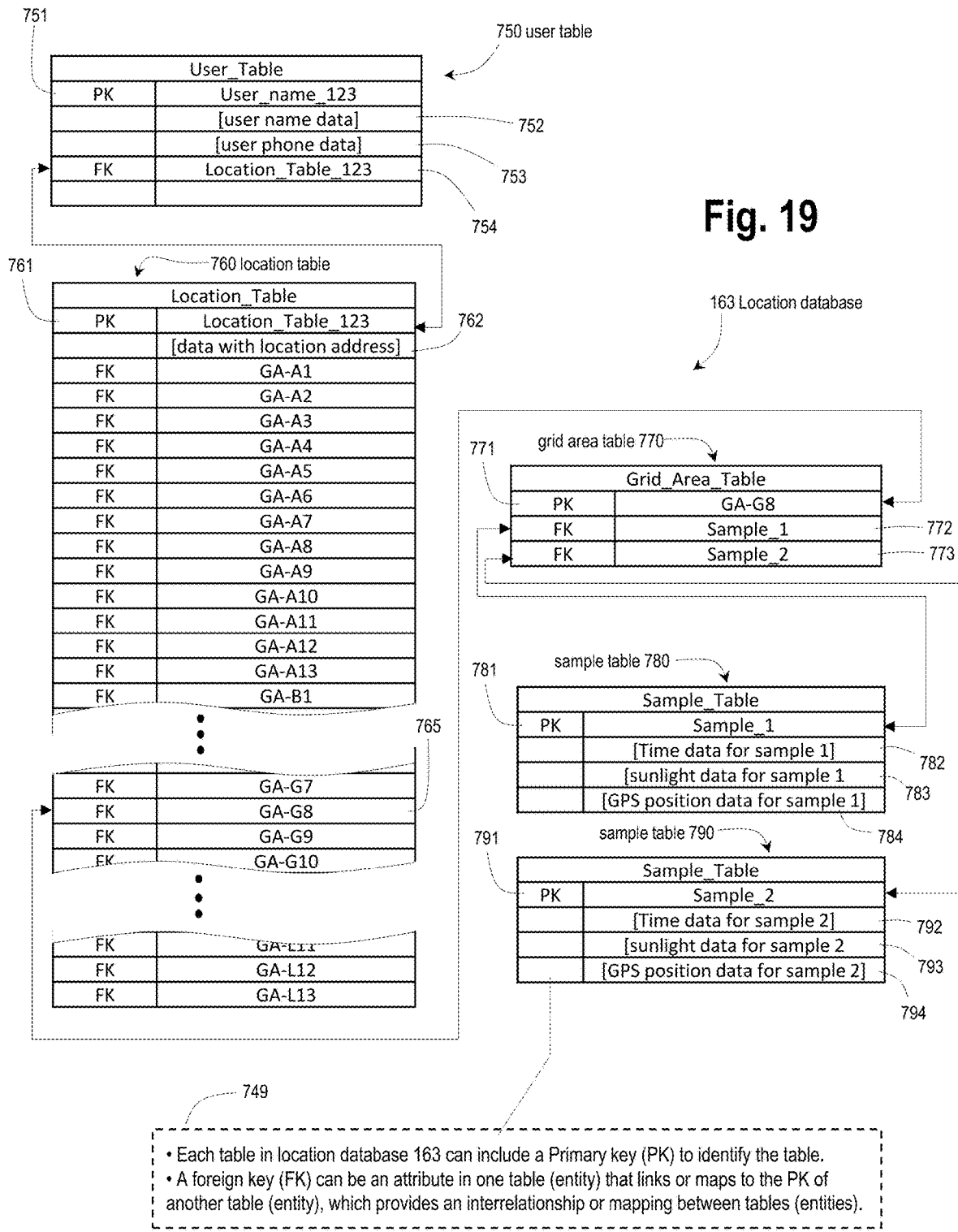
FIG. 19 is a schematic diagram of a location database with data records, in accordance with principles of the disclosed subject matter.

FIG. 19 is a schematic diagram of a location database 163 containing a user table 750, a location table 760 and various related tables, in accordance with principles of the disclosed subject matter. The user table 750 includes a reference record 751 with a primary key (PK). Such PK can be used to identify or call the table 750 in the database 163. Such database 163 is shown in FIG. 4.

As noted at 749 in FIG. 19, each table (in the location database 163) can include a Primary key (PK), in a reference record, to identify the table. As shown, some of the tables are provided with one or more foreign keys (FKs). The FK can be an attribute in one table that links or maps to the PK of another table, so as to provide an interrelationship or mapping between tables. The tables of FIG. 19 are linked as shown.

Accordingly, in addition to a reference record in each table, each table can also include a plurality of content records. The content records can include (a) the one or more foreign keys (FKs), which respectively reference another table as described above, or (b) other content.

Table 750 can include data regarding a user in data records 752 and 753, including a user's name and user's phone number, respectively. Table 750 also includes data record 754 that references the location table 760. That is, data record 754 references a location associated with the user. Additional data records can be generated if more locations, e.g., more lawns, are associated with the user.

Illustratively, location table 760 relates to location 400 shown in FIG. 11 and the grid map 430 shown in FIG. 12. Location table 760 includes the data record 761, which includes primary key that maps to table 750, and specifically to the foreign key in data record 754.

In data record 762, location table 760 can contain data regarding the address of the location, and/or other identifying information regarding the location, i.e., such as the location 400 shown in FIG. 11. Table 760 also contains foreign keys, in respective data records, that each map to a respective grid area table. In particular, table 760 includes data record 765 (with foreign key) that maps to primary key in data record 771, of grid area table 760 shown in FIG. 19. Each of the foreign keys shown in table 760 can be mapped to a respective grid area table, which is similar grid area table 770 in architecture and content.

Accordingly, the grid area table 770 includes data record 771 with primary key GA-G8. The grid area table 770 is generated to handle data associated with samples to the grid area G8, i.e., grid area table 770 lists various samples that have been generated for the grid area G8.

Accordingly, the table 770 includes content records 772, 773.

The data record 772 can include a FK to reference the sample table 780. The data record 773 can include a FK to reference the sample table 790.

The sample table 780 can include data regarding the first sample that has been generated for the particular grid area (G8), at the location 400. For example, the sample table 780 can include data records 782, 783, 784. Such data records can include the data shown at 512' in FIG. 15, i.e., the data relating to sample 1. The sample table 780 can also include other data relating to the sample. As shown, the data record 782 includes time data relating to a time that sample 1 was taken, data record 783 contains light level data for sample 1, and data record 784 contains GPS data for sample 1.

The sample table 790 can include data regarding the second sample that has been generated for the particular grid area (G8), at the location 400. For example, the sample table 790 can include data records 792, 793, 794. Such data records can include the data shown at 512' in FIG. 15, i.e., the data relating to sample 2. The sample table 790 can also include other data relating to the sample. As shown, the data record 792 includes time data relating to a time that sample 2 was taken, data record 793 contains light level data for sample 2, and data record 794 contains GPS data for sample 2.

It is appreciated that additional content records can be added, i.e., dynamically added, to the grid area table 770 shown in FIG. 19, as more samples are added. In general, further data record can be added as needed in response to ongoing operations.

In processing of the location database 163, data set forth in the various tables of the location database 163 can be retrieved by a call, by DPP 150 (or by controller 110 for example), to the particular table, which specifies the particular data record, field and/or member within the particular table. Also, in processing, data can be written to a particular table by outputting the data to the particular table, and specifying the particular record, field and/or member (within the particular table) to which the data should be written, for example. It is appreciated that data, as described herein, may be stored in a database, retrieved from a database, and/or otherwise manipulated using known computer processing techniques. Further, it is appreciated that various additional data can be included in any of the tables shown in FIG. 19, including any of the data described herein, as may be desired.

As described herein, light can be measured in lumens. Also, light can be measured in "lux." One lux is equal to one lumen per square meter. The lux measure allows for measurement of total "amount" of visible light present and the intensity of the illumination on a surface. For example, a light meter, i.e., light sensor 170 shown in FIG. 4, can generate a measurement of (a) 2500 lux in a first grid area on a cloudy day, and 5500 lux in a second grid area on a cloudy day. Accordingly, such measurements show a differential in light intensity, and treatment of such two different areas of the lawn can be adjusted based on such differential. For example, irrigation using a sprinkler system can be adjusted based on observed light levels. Time of year can be taken into account both with regard to inputting light data and in terms of adjusting treatment of the lawn or other location. For example, an adjustment factor can be used to compare light level sensing in July versus light level sensing in October, for example. It is appreciated that any suitable light sensor can be used in practice of the disclosure, and any suitable measure of light can be used.

The processing device 100 and/or LAS 140 of the disclosure can be provided with a clock or other time mechanism (and may access such clock or other time mechanism over a network) so as to provide for awareness of time, saving the time that an event occurred, performing action at a predetermined time, and performing other time related operations. As described herein, the machine 26, shown in FIG. 3, can be a lawnmower or some other service apparatus, for example. The lawnmower or other service apparatus can perform service to a location, i.e., a piece of land, such as mowing the grass.

Hereinafter, further aspects of the disclosure will be described.

As described herein, in at least some embodiments of the system of the disclosure, various processes are described as being performed by one or more computer processors. Such one or more computer processors can, in conjunction with a database or other data storage mechanism, provide and/or constitute a "processing machine," i.e., a tangibly embodied machine, in that such one or more computer processors can include various physical computing devices as otherwise described herein, various support structure to physically support the computing devices, other hardware, and other physical structure, for example. In embodiments, a processing machine of the disclosure can include one or more computer processors and one or more databases that are in communication with the one or more computer processors. A computer processor or processing machine of the disclosure can be part of a higher level system or apparatus.

As used herein, the term "computer processor" can be understood to include at least one processor that uses at least one memory. The at least one memory can store a set of instructions. The instructions may be either permanently or temporarily stored in the memory or memories of the processing machine or associated with the processing machine. The computer processor can execute the instructions that are stored in the memory or memories in order to process data, input data, output data, and perform related processing. The set of instructions may include various instructions that perform a particular task or tasks, such as any of the processing as described herein. Such a set of instructions for performing a particular task may be described as a program, software program, code or simply software. Accordingly, various processing is described herein as performed by a computer processor (CP). Such computer processor (CP) can be described as or can include: a computer processor portion, a computer processing portion, a processor, a system processor, a processing system, a server, a server processing portion, an engine, a processing engine, a central processing unit (CPU), a controller, a processor-based controller, an electronic computing device, an apparatus controller, an apparatus computer processor, a processing device, a computer operating system, an apparatus processing portion, an apparatus processing portion, an electronic control unit ("ECU"), a microcontroller, a microcomputer, a plurality of electronic computing devices or servers, other processor-based controller(s), and/or similar constructs, for example.

A computer processor and/or processing machine, of the disclosure, may be constituted by and/or be part of particular apparatus(es), system(s) and/or device(s) described herein. The computer processor can execute instructions that are stored in memory or memories to process data. This processing of data may be in response to commands by a user or users of the computer processor, in response to previous processing, in response to a request by another processing machine and/or any other input, for example. A user can be in the form of a user device, such as a cellular phone.

A computer processor and/or processing machine of the disclosure may also utilize (or be in the form of) any of a wide variety of technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that can be capable of implementing the steps of the processes of the disclosure.

The computer processor and/or processing machine used to implement the disclosure may utilize a suitable operating system. Thus, embodiments of the disclosure may include a processing machine running the Windows 11 operating system, the Windows 10 operating system, the Windows 8 operating system, Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the disclosure as described herein, it is not necessary that the computer processors and/or the memories of a processing machine be physically located in the same geographical place. That is, each of the computer processors and the memories used by the processing machine may be located in geographically distinct locations and connected so as to communicate in any suitable manner. Additionally, it is appreciated that each computer processor and/or the memory may be composed of different physical pieces of equipment. Accordingly, it is not necessary that a processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above can be performed by various components and various memories. However, it is appreciated that the processing performed by two distinct components as described herein may, in accordance with a further embodiment of the disclosure, be performed by a single component. Further, the processing performed by one distinct component as described above may be performed by two distinct components. For example, processing as described herein might be performed in part by a system or other system or server, in part by some third party resource, and in part by a user device. In a similar manner, the memory storage performed by two distinct memory portions as described herein may, in accordance with a further embodiment of the disclosure, be performed by a single memory portion. Further, the memory storage performed by one distinct memory portion as described above may be performed by two memory portions.

Further, as described herein, various technologies may be used to provide communication between the various processors and/or memories, as well as to allow the processors and/or the memories of the disclosure to communicate with any other entity; i.e., so as to obtain further instructions, transfer data, or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described herein, a set of instructions can be used in the processing of the disclosure on the processing machine, for example. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

It is appreciated that the instructions or set of instructions used in the implementation and operation of features of the disclosure may be in a suitable form such that a computer processor or processing machine may read the instructions. For example, the instructions that form a program may be in the form of a suitable programming language, which can be converted to machine language or object code to allow the processor or processors to read the instructions. That is, written lines of programming code or source code, in a particular programming language, can be converted to machine language using a compiler, assembler or interpreter. The machine language can be binary coded machine instructions that are specific to a particular type of processing machine, i.e., to a particular type of computer processor, for example. The computer processor understands the machine language.

Accordingly, a suitable programming language may be used in accordance with the various embodiments of the disclosure. Illustratively, the programming language used may include assembly language, Ada, APL, Basic, C, C++, COBOL, dBase, Forth, Fortran, Java, Modula-2, Pascal, Prolog, REXX, Visual Basic, Python, Ruby, PHP, Perl, JavaScript, and/or other scripting language, for example. Further, it is not necessary that a single type of instructions or single programming language be utilized in conjunction with the operation of the systems and methods of the disclosure. Rather, any number of different programming languages may be utilized as may be necessary or desirable.

Also, the instructions and/or data used in the practice of the disclosure may utilize any compression or encryption technique or algorithm, as may be desired. An encryption module might be used to encrypt data. Further, files or other data may be decrypted using a suitable decryption module, for example. Accordingly, a compression or encryption technique or algorithm can be used that transforms the data from an un-encrypted format to an encrypted format.

As described above, the disclosure may illustratively be embodied in the form of a processing machine, including a computer processor, for example, that includes at least one memory. It is to be appreciated that the set of instructions, i.e., the software for example, that enables the computer processor to perform the operations described herein may be contained on any of a wide variety of media or medium, as desired. Further, the data that can be processed by the set of instructions can be contained on any of a wide variety of media or medium. That is, the particular medium, i.e., the memory or data storage device used in a processing machine, utilized to hold the set of instructions and/or the data used in practice of the disclosure may take on any of a variety of physical forms or transmissions, for example. Illustratively, the medium or data storage device may be in a tangibly embodied form of paper, paper transparencies, a compact disk, a DVD, an integrated circuit, a hard disk, a floppy disk, an optical disk, a magnetic tape, a RAM, a ROM, a PROM, a EPROM, a CD-ROM, a DVD-ROM, a hard drive, a magnetic tape cassette, a wire, a cable, a fiber, communications channel, and/or may be in the form of a satellite transmissions or other remote transmission, as well as any other medium or source of data that may be read by the processors of the disclosure.

For example, exemplary embodiments are intended to cover all software or computer programs capable of enabling processors to implement the operations, designs and determinations as described herein. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed herein.

These computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Some of the disclosed embodiments include or otherwise involve data transfer over a network, such as communicating various inputs and outputs over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network may include multiple networks or subnetworks, each of which may include, for example, a wired or wireless data pathway. A network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

Examples of a network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

The database(s), memory or memories used in the processing machine that implements the disclosure may be in any of a wide variety of forms to allow the memory to hold instructions, data, or other information, as can be desired. Thus, a memory might be in the form of a database to hold data. The database might use any desired arrangement of files or data sets such as a flat file arrangement or a relational database arrangement, for example. The database can include any number of data records, tables, and/or other data structure. A table in a database can include a Primary key (PK) to identify the table. A foreign key (FK) can be an attribute in one table (entity) that links or maps to the PK of another table, so as to provide an interrelationship or mapping between tables and/or databases, for example.

In various processing described herein and illustrated by flowcharts or otherwise described, variables can be used in various processes. Such processes can include routines, subroutines, and steps, for example. The various variables can be passed between processes as may be needed in accord with the instructions provided to a processor. The various variables can be global variables that are available to the various processes, such as between a calling process and a subroutine, for example.

In the system and method of the disclosure, a variety of "user interfaces" may be utilized to allow a user to interface with the processing machine or machines that are used to implement the disclosure. As used herein, a user interface can include any hardware, software, or combination of hardware and software used by the processing machine that allows a user to interact with the processing machine and/or computer processor. A user interface may be in the form of a dialogue screen for example. A user interface may also include any of a mouse, touch screen, keyboard, voice reader, voice recognizer, dialogue screen, menu box, list, checkbox, toggle switch, a light, a pushbutton or any other device that allows a user to receive information regarding the operation of the processing machine as the processing machine processes a set of instructions and/or provide the processing machine with information. Accordingly, the user interface can be any device that provides communication between a user and a processing machine and/or computer processor. The information provided by the user to the processing machine through the user interface may be in the form of a command, a selection of data, or some other input, for example.

A user interface of the disclosure can be provided by or in the form of a user device or electronic user device. Also, systems of the disclosure can include or be in communication with one or more user devices that serve to interact or interface with a human user. A user device can be any appropriate electronic device, such as a cellular (mobile) telephone, smart phone, a tablet computer, a laptop computer, a desktop computer, an e-reader, an electronic wearable, smartwatch, gaming console, personal digital assistant (PDA), portable music player, fitness trackers with smart capabilities, and/or a server terminal, for example.

Such a user device can permit a user to input requests for information, output information, and/or process data. A user device can be in the form of and/or include a computer processor and/or a processing machine, as described herein.

As discussed above, a user interface can be utilized by the processing machine, which performs a set of instructions, such that the processing machine processes data for a user. The user interface can be typically used by the processing machine for interacting with a user either to convey information or receive information from the user. However, it should be appreciated that in accordance with some embodiments of the systems and methods of the disclosure, it is not necessary that a human user actually interact with a user interface used by the processing machine of the disclosure. Rather, it is also contemplated that the user interface of the disclosure might interact, i.e., convey and receive information, with another processing machine, rather than a human user. Accordingly, the other processing machine might be described as a user. Further, it is contemplated that a user interface utilized in the systems and methods of the disclosure may interact partially with another processing machine or processing machines, while also interacting partially with a human user.

Features as disclosed herein may be described in context of particular units or dimensions. It is appreciated that alternative units or dimensions can be used as desired. Additionally, conversion can be performed between units or dimensions as may be desired.

In this disclosure, quotation marks, such as with the language "computer processor", have been used to enhance readability and/or to parse out a term or phrase for clarity.

It will be appreciated that features, elements and/or characteristics described with respect to one embodiment of the disclosure may be variously used with other embodiments of the disclosure as may be desired.

It will be appreciated that the effects of the present disclosure are not limited to the above-mentioned effects, and other effects, which are not mentioned herein, will be apparent to those in the art from the disclosure and accompanying claims.

Although the preferred embodiments of the present disclosure have been disclosed for illustrative purposes, those skilled in the art will appreciate that various modifications, additions and substitutions are possible, without departing from the scope and spirit of the disclosure and accompanying claims.

As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, process step, region, layer or section from another region, layer or section. Thus, a first element, component, process step, region, layer or section could be termed a second element, component, process step, region, layer or section without departing from the teachings of the present disclosure.

Spatially and organizationally relative terms, such as "lower", "upper", "top", "bottom", "left", "right", "north", "south", "east", "west", "up", "down", "right", "left", "upper threshold", "lower threshold" and the like, may be used herein for ease of description to describe the relationship of one element or feature to another element(s) or feature(s) as illustrated in the drawing figures. It will be understood that spatially and organizationally relative terms are intended to encompass different orientations of or organizational aspects of components in use or in operation, in addition to the orientation or particular organization depicted in the drawing figures. For example, if a device or apparatus in the drawing figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein should be interpreted accordingly.

Embodiments are also intended to include or otherwise cover methods of using and methods of manufacturing any and all of the elements disclosed above.

As used herein, "data" and "information" have been used interchangeably.

The terminology used herein is for the purpose of describing particular embodiments only and is not intended to be limiting of the disclosure. As used herein, the singular forms "a", "an" and "the" are intended to include the plural forms as well, unless the context clearly indicates otherwise.

It will be further understood that the terms "comprises" and/or "comprising," when used in this specification, specify the presence of stated features, integers, process steps, operations, elements, and/or components, but do not preclude the presence or addition of one or more other features, integers, process steps, operations, elements, components, and/or groups thereof.

Embodiments of the disclosure are described herein with reference to diagrams, flowcharts and/or other illustrations, for example, that are schematic illustrations of idealized embodiments (and intermediate components) of the disclosure. As such, variations from the illustrations are to be expected. Thus, embodiments of the disclosure should not be construed as limited to the particular organizational depiction of components and/or processing illustrated herein but are to include deviations in organization of components and/or processing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, as otherwise noted herein, when a particular feature, structure, or characteristic is described in connection with any embodiment, it is submitted that it is within the purview of one skilled in the art to effect and/or use such feature, structure, or characteristic in connection with other ones of the embodiments.

While the subject matter has been described in detail with reference to exemplary embodiments thereof, it will be apparent to one skilled in the art that various changes can be made, and equivalents employed, without departing from the scope of the disclosure.

All references and/or documents referenced herein are hereby incorporated by reference in their entirety.

It will be readily understood by those persons skilled in the art that the present disclosure is susceptible to broad utility and application. Many embodiments and adaptations of the present disclosure other than those herein described, as well as many variations, modifications and equivalent arrangements, will be apparent from or reasonably suggested by the present disclosure and foregoing description thereof, without departing from the substance or scope of the disclosure.

Accordingly, while the present disclosure has been described here in detail in relation to its exemplary embodiments, it is to be understood that this disclosure is only illustrative and exemplary of the present disclosure and is made to provide an enabling disclosure of the disclosure. Accordingly, the foregoing disclosure is not intended to be construed or to limit the present disclosure or otherwise to exclude any other such embodiments, adaptations, variations, modifications and equivalent arrangements.

What is claimed is:

1. A system to assess light conditions at a location, the system including a tangibly embodied computer processor (CP) and a tangibly embodied database, the CP implementing instructions on a non-transitory computer medium disposed in the database, and the database in communication with the CP, the system comprising:
   a communication portion for providing communication between the CP and a user device;
   the database that includes the non-transitory computer medium, and the database including the instructions, and
      the database storing a grid map that includes a plurality of grid areas that segregate the location;
   a location sensor that generates sensor location data based on physical location;
   a light sensor that generates sensor light data based on observed light; and
   the CP, and the CP performing processing including:
      determining that a first sample event has been attained;
      inputting, based on the determining that the first sample event has been attained, first sample data relating to a first sample, and the first sample data including first location data and first light data, (a) the first location data representing where the first sample was taken, and, (b) the first light data including a first light level value,
         the first location data is part of the sensor location data, and the first light data is part of the sensor light data;
      identifying, based on the first location data, a first grid area, of the plurality of grid areas, that corresponds to the first location data;
      associating, based on the identifying, the first sample with the first grid area;
      aggregating the first sample with a previous sample that has been associated, by the CP, with the first grid area, the previous sample including previous light data, and the previous light data including a previous light level value;
         the aggregating including generating a light value result based on the first light level value and the previous light level value; and
      applying the light value result to an operation for the location.

2. The system of claim 1, the aggregating including determining an average value of the first light level value and the previous light level value, such that the light value result is an average of the first light level value and the previous light level value.

3. The system of claim 1, the first location data including a Global Positioning System (GPS) location; and the identifying, the first grid area that corresponds to the first location data, including:
　determining a boundary of the first grid area; and
　determining that the GPS location of the first sample falls within the boundary of the first grid area.

4. The system of claim 1, the operation including providing a plan via the user interface for at least one of irrigating, fertilizing, seeding and cutting a lawn at the location based on the light value result.

5. The system of claim 1, further comprising at least one of a tool and a machine, and the operation including causing the at least one of a tool and a machine to operate in accordance with a plan generated by the CP based on the light value result.

6. The system of claim 1, the location sensor includes at least one of a stereocamera and a lidar detector configured to measure objects at the location, and the CP performing processing further including generating a shade map defining points at the location that will experience shade over time based on the measured objects.

7. The system of claim 1, the inputting the plurality of defining points includes presenting the user with a digital map on the user device, and the user selecting the defining points on the digital map.

8. The system of claim 1, the CP performing processing further including generating the grid map, and the generating the grid map including:
　inputting a plurality of defining points that represent an extent of the location; and
　generating the plurality of grid areas based on the plurality of defining points.

9. The system of claim 8, the system including a service apparatus for working the location, and the location sensor and the light sensor integrated with the service apparatus; and
　the inputting the plurality of defining points includes:
　　(a) inputting a first defining point, of the plurality of defining points, upon the service apparatus being positioned at a first corner of the location;
　　(b) inputting a second defining point, of the plurality of defining points, upon the service apparatus being positioned at a second corner of the location; and
　　(c) inputting a third defining point, of the plurality of defining points, upon the service apparatus being positioned at a third corner of the location.

10. The system of claim 1, the system including a service apparatus for working the location, and the location sensor and the light sensor integrated with the service apparatus; and
　the service apparatus includes at least part of the CP.

11. The system of claim 1, the CP is distributed between: (a) an apparatus processor portion of a service apparatus that is physically present at the location, and (b) a server processor portion that is part of a central server that supports multiple locations.

12. The system of claim 1, the CP is distributed between: (a) an apparatus processor portion of a service apparatus that is physically present at the location, and (b) a server processor portion that is part of a central server that supports multiple locations, and
　the apparatus processor portion, the server processor portion, and the user device all in electronic communication with each other over a network.

13. The system of claim 1, the user device is at least one selected from the group consisting of a computer, a cell phone, and a tablet.

14. The system of claim 1, the location is a lawn, and the system is integrated with a service apparatus for working the lawn.

15. A machine provided to service a location and to assess light conditions at the location, the machine including a mechanical service mechanism, a tangibly embodied computer processor (CP) and a tangibly embodied database, the CP implementing instructions on a non-transitory computer medium disposed in the database, and the database in communication with the CP, the machine comprising:
　a communication portion for providing communication between the CP and a user device;
　the database that includes the non-transitory computer medium, and the database including the instructions, and
　　the database storing a grid map that includes a plurality of grid areas that segregate the location;
　a location sensor that generates sensor location data based on physical location;
　a light sensor that generates sensor light data based on observed light; and
　the CP, and the CP performing processing including:
　　determining that a first sample event has been attained;
　　inputting, based on the determining that the first sample event has been attained, first sample data relating to a first sample, and the first sample data including first location data and first light data, (a) the first location data representing where the first sample was taken, and, (b) the first light data including a first light level value,
　　　the first location data is part of the sensor location data, and the first light data is part of the sensor light data;
　　identifying, based on the first location data, a first grid area, of the plurality of grid areas, that corresponds to the first location data;
　　associating, based on the identifying, the first sample with the first grid area;
　　aggregating the first sample with a previous sample that has been associated, by the CP, with the first grid area, the previous sample including previous light data, and the previous light data including a previous light level value;
　　　the aggregating including generating a light value result based on the first light level value and the previous light level value; and
　　applying the light value result to an operation for the location.

16. The machine of claim 15, the determining that a first sample event has been attained includes monitoring time that has elapsed since a prior sample and/or monitoring movement of the location sensor.

17. The machine of claim 15, the operation for the location includes an irrigation operation to water the location.

18. The machine of claim 15, the machine is a lawnmower, and the mechanical service mechanism is a cutter deck of the lawnmower.

19. A method to assess light conditions at a location, the method performed by a system including a tangibly embodied computer processor (CP) and a tangibly embodied database, the CP implementing instructions on a non-transitory computer medium disposed in the database, and the database in communication with the CP, the method comprising:
　storing the instructions in the database;

storing a grid map in the database, the grid map including a plurality of grid areas that segregate the location;

determining that a first sample event has been attained;

inputting, based on the determining that the first sample event has been attained, first sample data relating to a first sample, and the first sample data including first location data and first light data, (a) the first location data representing where the first sample was taken, and, (b) the first light data including a first light level value;

identifying, based on the first location data, a first grid area, of the plurality of grid areas, that corresponds to the first location data;

associating, based on the identifying, the first sample with the first grid area;

aggregating the first sample with a previous sample that has been associated, by the CP, with the first grid area, the previous sample including previous light data, and the previous light data including a previous light level value, the aggregating including generating a light value result based on the first light level value and the previous light level value; and applying the light value result to an operation for the location.

20. The method of claim 19, wherein applying the light value result to an operation for the location includes providing a plan via the user interface for at least one of irrigating, fertilizing, seeding and cutting a lawn at the location based on the light value result.

* * * * *